United States Patent [19]

Taki et al.

[11] Patent Number: 5,748,421
[45] Date of Patent: May 5, 1998

[54] MAGNETIC RECORDING DISK

[75] Inventors: Kazunari Taki; Riki Matsuda, both of Nagoya, Japan

[73] Assignee: Brother Kogyo Kabushiki Kaisha, Aichi-ken, Japan

[21] Appl. No.: 731,901

[22] Filed: Oct. 22, 1996

Related U.S. Application Data

[63] Continuation of Ser. No. 210,311, Mar. 17, 1994, abandoned.

[30] Foreign Application Priority Data

| Mar. 19, 1993 | [JP] | Japan | 5-060541 |
| Mar. 19, 1993 | [JP] | Japan | 5-060542 |
| Mar. 19, 1993 | [JP] | Japan | 5-060543 |
| Mar. 19, 1993 | [JP] | Japan | 5-060544 |

[51] Int. Cl.$^6$ ............................................. G11B 5/82
[52] U.S. Cl. ............................................. 360/135
[58] Field of Search ............................................. 360/135

[56] References Cited

U.S. PATENT DOCUMENTS

| 4,735,840 | 4/1988 | Hedgcoth | 428/65 |
| 4,829,799 | 5/1989 | Coe et al. | 360/135 |
| 4,911,967 | 3/1990 | Lazzari | 360/135 |
| 4,961,123 | 10/1990 | Williams et al. | 360/135 |
| 5,388,020 | 2/1995 | Nakamura et al. | 360/135 |

OTHER PUBLICATIONS

Japanese Unexamined Patent Application No. 2-294931.
Japanese Unexamined Patent Application No. 3-173917.
Japanese Unexamined Patent Application No. 4-113511.

*Primary Examiner*—Robert S. Tupper
*Attorney, Agent, or Firm*—Kane, Dalsimer, Sullivan, Kurucz, Levy, Eisele and Richard, LLP

[57] ABSTRACT

A magnetic recording disk, for recording information, has a circular-shaped non-magnetic support formed with a plurality of tracks extending in a circumferential direction, each track of the plurality of tracks having a band-shaped contour having an upper flat surface and having a width in a radial direction, the plurality of tracks being juxtaposed in the radial direction so that adjacent tracks are separated by an inter-track gap. A magnetic layer is provided on the non-magnetic support. A protective layer is provided on the magnetic layer.

8 Claims, 23 Drawing Sheets

RADIAL DIRECTION OF MAGNETIC DISK 10

$W_1 > G_1$
$W_1 + G_1 < W_c$
$W_1 + 2G_1 > W$
$t > d$

RADIAL DIRECTION OF THE MAGNETIC DISC 10

$W_1 < W$
$W_1 + 2G_1 > W$
$t > d$ $W_1 > G_1$
$W_1 + G_1 < W_C$
$W_1 + 2G_1 > W$
$t > d$

RADIAL DIRECTION $W_1 > W$
$W_1 + 2G_1 > W$
$t > d$

RADIAL DIRECTION $W_1 > G_1$
$W_1 + G_1 < W_C$
$W_1 + 2G_1 > W$
$t > d$

RADIAL DIRECTION $W_1 > W$
$W_1 + 2G_1 > W$
$t > d$

RADIAL DIRECTION $W_1 > G_1$
$W_1 + G_1 < W_c$
$W_1 + 2G_1 > W$
$t > d$

RADIAL DIRECTION $W_1 > W$
$W_1 + 2G_1 > W$
$t > d$

RADIAL DIRECTION

MAGNETIC RECORDING DISK

This application is a continuation of application Ser. No. 08/210,311, filed Mar. 17, 1994, now abandoned.

BACKGROUND OF THE INVENTION

1. Field of the Invention

The present invention relates to a magnetic recording disk and more particularly to the magnetic recording disk having a high recording density.

2. Description of the Related Art

As shown in FIG. 1, a conventional magnetic recording disk 100, of a type including a magnetic thin film, includes a support 104 formed from a substrate 102 and a non-magnetic lower layer 103, a magnetic layer 106, and a protective layer 108.

The substrate 102 is formed from a disk made of glass, alumite, an aluminum alloy, or similar appropriate substance. The non-magnetic lower layer 103 is formed from a thin film that is plated, sputtered or otherwise formed on the substrate 102. The material of the non-magnetic lower layer 103 can be chromium, tungsten, molybdenum or a metal alloy comprised mainly of these metals. The magnetic layer 106 is formed from a thin film that is sputtered, ion plated, vapor metal deposited, or otherwise formed on the substrate 104. The material of the magnetic layer 106 can be ferromagnetic metal such as copper, iron or nickel, a metal alloy comprised mainly of these metals such as CoNi or CoNiCr, an oxidized metal such as $\gamma$-$Fe_2O_3$, or other magnetic material. The protective layer 108 is formed from a thin film that is sputtered or otherwise formed on the magnetic layer 106. The material of the protective layer 108 can be carbon, $Si_2O$, or other suitable material. A lubrication layer 110 formed from, for example, a fluorine type lubricant, is generally provided on the protective layer 108.

A magnetic head 200 for recording information on and reproducing information from the above-described magnetic recording disk 100 is disposed above the magnetic recording disk 100 as shown in FIG. 2. The magnetic head is formed from a slider 201, a core 202, and a record/reproduce coil 203 (not shown) installed on the core 202. The slider is formed with one side shaped similar to the bow of a boat, as shown in FIG. 3. The core is fitted to the side of the slider opposite the bow-shaped side.

A drive means (not shown) is provided for rotating the magnetic recording disk 100 at a high speed. When the disk 100 is stationary, the magnetic head contacts the disk 100. When the magnetic recording disk 100 is rotated by the drive means during recording or reproducing, air currents are generated at the surface of the magnetic recording disk 100, as shown in FIG. 3. Based on principles used in air bearings, the magnetic head 200 is lifted away from the magnetic recording disk 100 by the air currents so that the magnetic head hovers less than 0.1 μm over the magnetic recording disk 100 as shown in FIG. 3. When recording or reproducing is completed, the drive means stops rotating the disk 100, and the head and the disk 100 again come into contact. This type of arrangement is termed a contact-start-stop (CSS) arrangement.

As shown in FIGS. 4 (a) and 4(b), a gap is provided in the core 202 of the magnetic head 200. The gap is formed so that a fan-shaped magnetic field is formed thereat when an electric current is applied to the coil. The head is disposed so that the magnetic field intersects the magnetic disk 100. When the magnetic head is disposed close to the magnetic recording disk 100, as shown in FIG. 4(a), the magnetic lines of force that intersect the magnetic recording disk 100 have only a small spread so that only a short portion of the magnetic recording disk 100 is magnetized at any one time. However, when the magnetic head is disposed farther away from the magnetic disk 100, as shown in FIG. 4(b), the magnetic field magnetizes a longer portion of the magnetic recording disk 100 at any one time. The smaller the individual magnetized portions, the more information can be recorded within a certain space on the magnetic recording disk 100, and therefore the higher the recording density of the magnetic recording disk 100.

To increase the floating stability of the magnetic head so that it can be maintained as close to the magnetic recording disk 100 as possible, the surface of the magnetic recording disk 100 should be as level as possible. The distance at which the magnetic head can be disposed above the magnetic recording disk 100 is dependent on the roughness of the surface of the magnetic recording disk substrate. For example, it is preferable that the surface roughness be one tenth or less the distance the magnetic head is separated from the magnetic recording disk 100.

Contrarily, if the magnetic recording disk 100 is completely flat, a large surface area of the magnetic recording head contacts the magnetic recording disk 100 when the magnetic recording disk 100 is stationary. This large contacting surface generates a great deal of friction between the magnetic head and the magnetic recording disk 100 when the recording device is started up or shut down. This friction can abrade the magnetic recording disk 100 and reduce its quality. Further, if the magnetic head is disposed only a short distance from the magnetic recording disk 100 when the magnetic recording disk 100 comes to a halt, oxygen, nitrogen, water, or other substances between the magnetic head and the magnetic recording disk 100 can cause the magnetic head and the magnetic recording disk 100 to adhere strongly to each other. When the device is started up in this situation, a great force is generated between the magnetic head and the magnetic recording disk 100, possibly damaging the magnetic head, the magnetic recording disk 100, or both.

During recording, the magnetic head magnetizes the magnetic recording disk 100 in the direction that the magnetic recording disk 100 rotates. Therefore, the hysterisis loop of the magnetic recording disk 100 is preferably sharply angular in regards to the magnetizing force applied in the circumferential direction. The angular shape represents retensitivity nearly equal in the maximum value of the flux density. Because it is unnecessary to magnetize the magnetic recording disk in its radial direction, retensitivity obtained for the magnetizing force in the radial direction may have a substantially zero value. Thus, it is beneficial for the magnetic recording disk to be magnetically anisotropic in the circumferential direction.

Conventionally, the support 104 is texture processed as shown in FIG. 1, in order to prevent the magnetic head 200 and the magnetic recording disk 100 from adhering to each other and also in order to provide the magnetic anisotropy in the circumferential direction. During the texture processing, the support 104 is rotated and supplied with a polishing compound. A polishing tape is pressed against the rotating support, thereby abrading the surface of the support 104 in the circumferential direction. The support 104 is thus given a minutely uneven surface, the peaks and inter-tracks of which run in a concentric circular pattern.

When the magnetic layer 106 is later formed on the support 104, the magnetic layer 106 takes on the uneven shape of the abraded surface, so that the crystals of the magnetic material orient with the anisotropy of the uneven shape. Accordingly, the magnetic layer 106 has a magnetic anisotropy in the circumferential direction and presents hysterisis of a sharp angular form when applied with magnetizing force in the circumferential direction. The uneven surface also reduces the surface area of magnetic recording disk which contacts the magnetic head 200, thus reducing the friction coefficient.

However, there has been known a problem with the above-described conventional magnetic recording disk 100 in that the support 104 is not uniformly abraded during the texture process. Because the support 104 is abraded to irregular thicknesses as shown in FIG. 1, the magnetic recording disk 100 is produced with a nonuniform surface, such as can be seen by the difference between high peak A and low peak B in FIG. 1. If an attempt is made to increase the recording density of the magnetic recording disk 100 by reducing the distance between the magnetic head 200 and the magnetic recording disk 100, the magnetic head 200 can collide with the high peak A of the magnetic recording disk 100 as shown in FIG. 5. This is known as a head crash. Because head crashes can destroy the magnetic recording disk 100, the distance between the magnetic head and the magnetic recording disk 100 can not be reduced past a certain amount. This frustrates attempts to increase the recording density of the magnetic recording disk 100.

Because this conventional texture processes simply use an abrasive compound, it has been impossible to process the magnetic recording disk to a uniform depth, length, or width. When recording or reproducing, the distance between the magnetic head 200 and the magnetic recording disk 100 varies, resulting in that the outputted signal greatly fluctuates, thereby lowering the signal-to-noise ratio.

SUMMARY OF THE INVENTION

It is therefore an object of the present invention to overcome the above-described drawbacks, and to provide a magnetic recording disk which has a smooth surface enabling to reduce the distance between it and the magnetic head while preventing the head crash so as to attain a high recording density in the circumferential direction.

Another object of the present invention is to provide a magnetic recording disk which can obtain a high recording density also in the radial direction.

Another object of the present invention is to provide a magnetic recording disk which can obtain a good reproduction output signal.

Another object of the present invention is to provide a magnetic recording disk which can reliably prevent the magnetic head from adhering thereto.

Another object of the present invention is to provide a magnetic recording disk which can attain a good magnetic anisotropy in the circumferential direction.

In order to solve the above objects, the present invention provides a magnetic recording disk, for recording information, comprising: a circular-shaped non-magnetic support formed with a plurality of tracks extending in a circumferential direction, each track of the plurality of tracks having a band-shaped contour having an upper flat surface and having a width in a radial direction perpendicular to the circumferential direction, the plurality of tracks being juxtaposed in the radial direction so that adjacent tracks are separated by an inter-track gap in the radial direction; a magnetic layer provided on the non-magnetic support; and a protective layer provided on the magnetic layer.

Each track and the inter-track gap may preferably have widths in the radial direction of the magnetic recording disk, the width of each track being greater than the width of the inter-track gap. The plurality of tracks may be juxtaposed in a concentric circular pattern or in a spiral pattern.

Each track of the plurality of tracks may be formed with a plurality of band-shaped raised zones, the raised zones of each track being provided so as to follow the contour of the corresponding track, each of the raised zones of each track having an upper flat surface, the plurality of raised zones being juxtaposed in the radial direction so that adjacent raised zones are separated by an inter-zone gap.

According to another aspect, the present invention provides a magnetic recording disk for being recorded on or reproduced by a core of a magnetic head disposed so that during recording on or reproducing from the magnetic recording disk the core confronts a surface of the magnetic recording disc, the core having a width, the width being in a direction parallel to a radial direction of the magnetic recording disk when the magnetic head is disposed for recording on or reproducing from the magnetic recording disk, the core and the surface of the magnetic recording disc being separated by a distance when the magnetic head is disposed for recording on or reproducing from the magnetic recording disk, the magnetic recording disk comprising: a non-magnetic substrate having a smooth surface; a non-magnetic thin film supported on the smooth surface of the non-magnetic substrate, the non-magnetic thin film being formed in a plurality of tracks, each track of the plurality of tracks having a band-shaped curved contour, the contour of each track of the plurality of tracks having a width in the radial direction of the magnetic recording disk, tracks of the plurality of tracks being juxtaposed in the radial direction so that adjacent tracks are separated by an inter-track gap, the width of each track of the plurality of tracks being greater than the inter-track gap; a magnetic layer supported on the non-magnetic thin film; and a protective layer supported on the magnetic layer.

BRIEF DESCRIPTION OF THE DRAWINGS

The above and other objects, features and advantages of the invention will become more apparent from reading the following description of the preferred embodiment taken in connection with the accompanying drawings in which:

FIG. 4 (b) is a side view showing extent at which magnetic lines of force, produced by the core shown in FIG. 4 (a) during recording, cut through the magnetic recording disk while the core is positioned relatively far from the magnetic recording disk;

FIG. 11 (b) is a top view showing another possible pattern for tracks of the magnetic recording disk according to the first preferred embodiment;

FIG. 20 (b) is a top view showing another possible pattern for tracks of the magnetic recording disk according to the second preferred embodiment;

FIG. 27 (b) is a top view showing another possible pattern for tracks of the magnetic recording disk according to the third preferred embodiment;

FIG. 28 (b) is a cross-sectional view showing a magnetic recording disk according to a second example of the fourth preferred embodiment taken along a plane parallel to a radial direction of the magnetic recording disk;

FIG. 29 (b) is a cross-sectional view showing a magnetic recording disk according to a fourth example of the fourth preferred embodiment taken along a plane parallel to a radial direction of the magnetic recording disk;

DETAILED DESCRIPTION OF THE PREFERRED EMBODIMENTS

Figure 1:
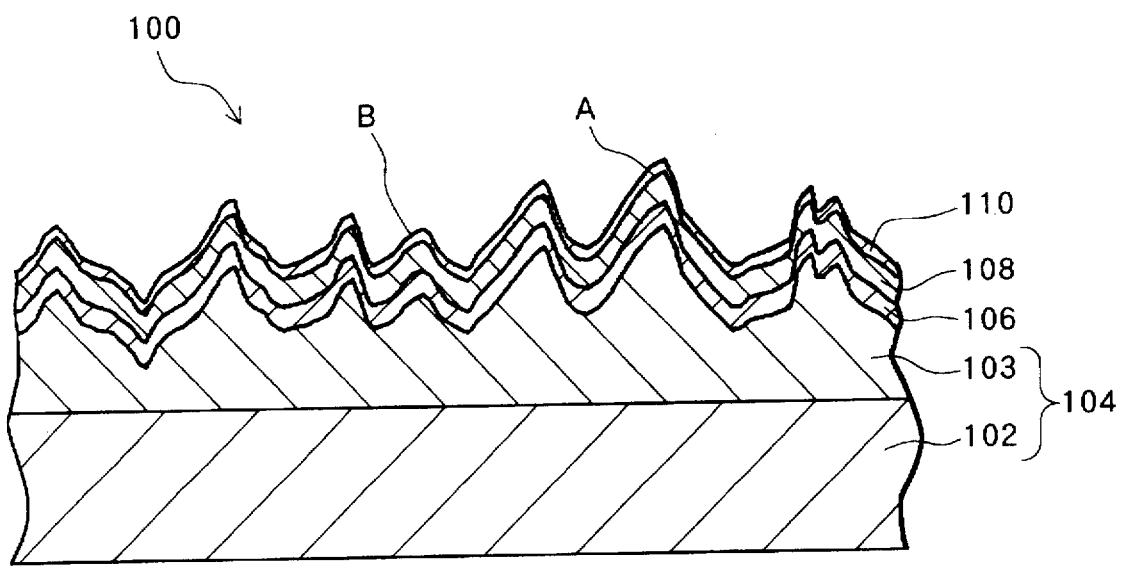
FIG. 1 is a cross-sectional view showing a conventional magnetic recording disk.
Figure 2:
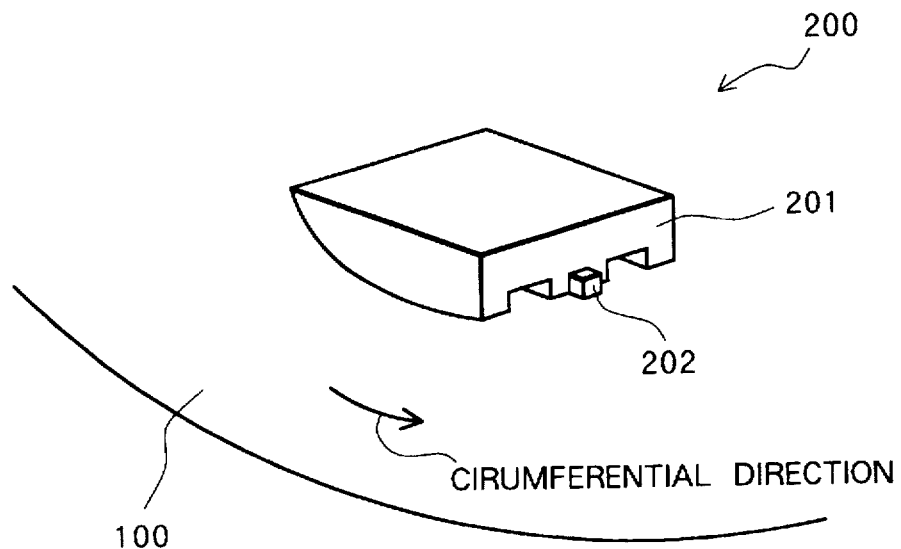
FIG. 2 is a perspective view showing a magnetic recording head used for recording on and reproducing from magnetic recording disk.
Figure 3:
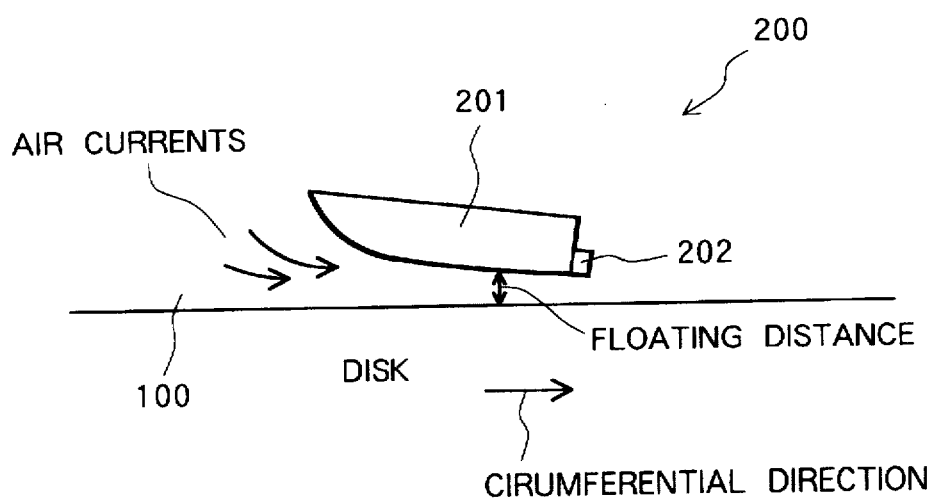
FIG. 3 is a side view showing the magnetic recording head shown in FIG. 2 in operation.
Figure 4:
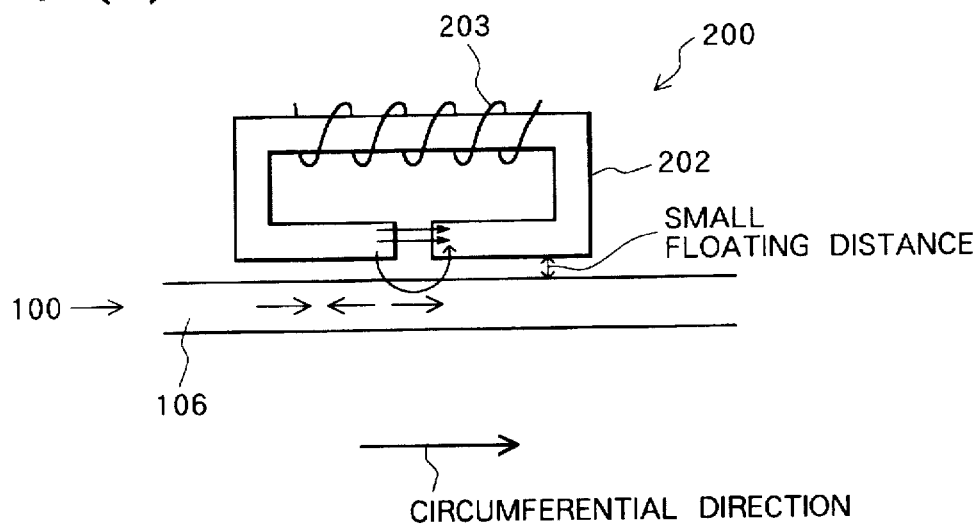
FIG. 4 (a) is a side view showing extent at which magnetic lines of force, produced by a core of the magnetic recording head during recording, cut through the magnetic recording disk while the core is positioned relatively close the magnetic recording disk.
Figure 4:
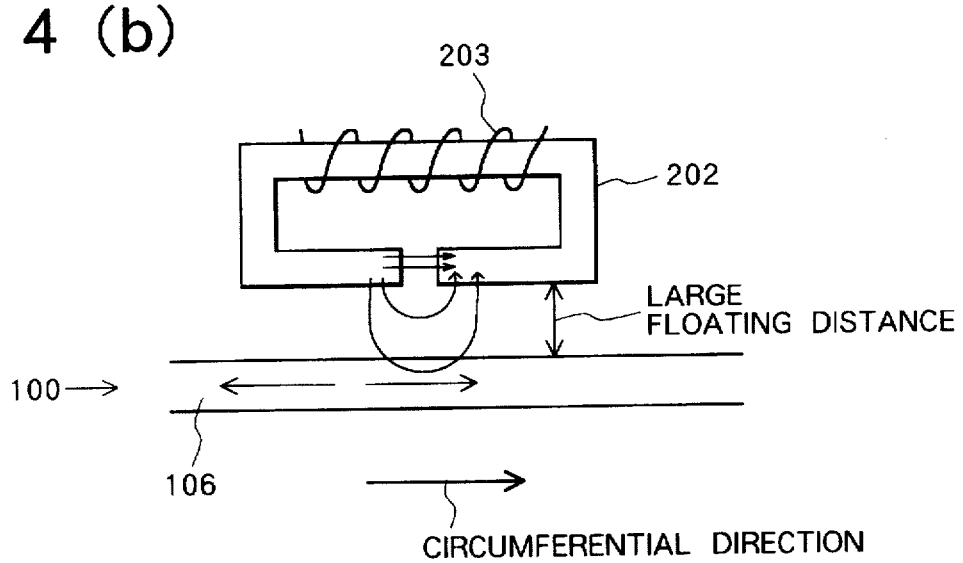
Figure 5:
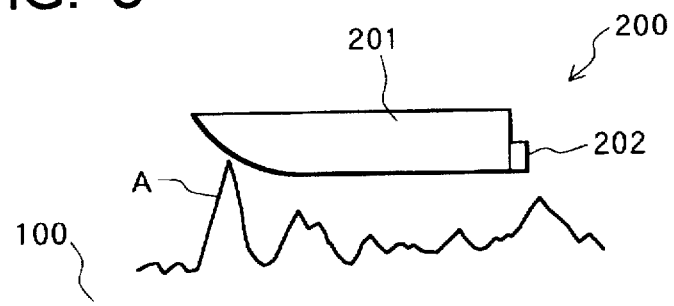
FIG. 5 is a side view showing a magnetic recording head colliding with a protrusion on a magnetic recording head.

A magnetic recording disk according to preferred embodiments of the present invention will be described while referring to the accompanying drawings wherein like parts and components are designated by the same reference numerals to avoid duplicating description.

Figure 6:
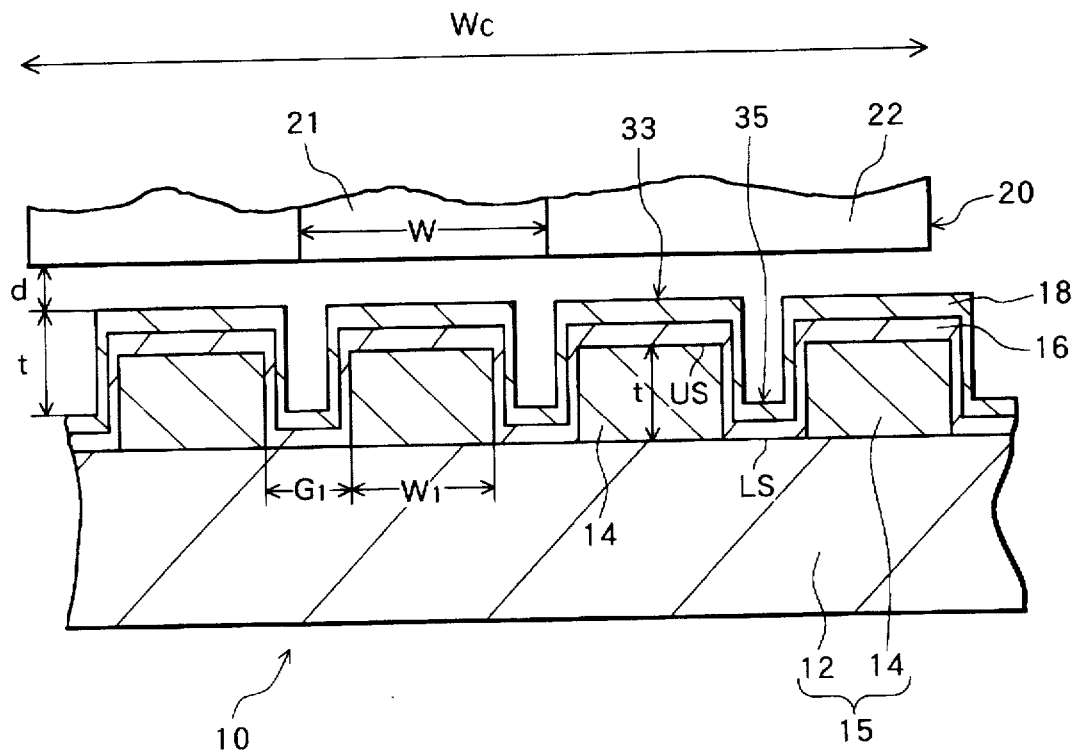
FIG. 6 is a cross-sectional view showing a magnetic recording disk according to a first preferred embodiment of the present invention taken along a plane parallel to a radial direction of the magnetic recording disk.

As shown in FIG. 6, a magnetic recording disk 10 according to a first preferred embodiment of the present invention includes a non-magnetic support 15, a magnetic layer 16 supported on the support 15, and a protective layer 18. The support 15 includes a substrate 12 and a non-magnetic thin film 14. The substrate 12 is formed from glass or other similar substance. The non-magnetic thin film 14 is provided on the substrate 12 in bands as will be described below and formed from a suitable material such as tantalum. The magnetic layer 16 is provided on the non-magnetic thin film 14 and formed from a ferromagnetic material such as copper, iron, or nickel, or an alloy of these metals such as CoNi, or CoNiCr, or an iron oxide such as $\gamma$-$Fe_2O_3$. The protective layer 18 is provided on the magnetic layer 16 and formed from, for example, a carbon film or $SiO_2$ film. A layer of lubricant (not shown), for example, fluorine lubricant, can also be provided on the protective layer 18.

The substrate 12 can be made from a material other than glass, as long as the material has a smooth surface. For example, the substrate can be made from a metal such as an aluminum alloy or a ceramic such as alumina.

The non-magnetic thin film 14 can be made from any non-magnetic material. Examples include metals such as aluminum, tantalum, gold, silver, copper, titanium, or chemical compounds including nitride such as titanium nitride or silicon nitride, oxides such as silicon oxide or aluminum oxide, or sulfides such as zinc sulfide. Also, materials for the magnetic layer 16 and the protective layer 18 are not limited to the examples presented.

According to the present invention, the non-magnetic thin film 14 includes a plurality of band-shaped curved tracks 33. The tracks are juxtaposed in a concentric circular or spiral pattern on the substrate 12. Each track 33 has a width $W_1$ in a radial direction of the magnetic recording disk. Inter-track portions 35 are provided between adjacent tracks 33 so as to separate adjacent tracks 33 with a gap $G_1$. The inter-track portions 35 serve to prevent the magnetic head 20 from adhering to the magnetic recording disk when the disk is stationary. In other words, according to the present invention, the non-magnetic support 15 forms the tracks 33 and the inter-track portions 35. As shown in FIG. 6, each track 33 has an upper flat surface US, and each inter-track portion 35 has a lower surface LS. The magnetic layer 16 is formed uniformly and entirely over the upper flat surfaces US and the lower surfaces LS so as to be provided entirely over the non-magnetic support 15. The protective layer 18 is provided uniformly and entirely over the magnetic layer 16.

It is noted that the width $W_1$ of each track 33 is greater than the gap $G_1$ formed by the inter-track portions 35. There are no particular limitations to the ratio of the width $W_1$ of the tracks 33 to the gap $G_1$ formed by the inter-track portions 35, as long as the width $W_1$ of the tracks 33 is greater than the gap $G_1$ of the inter-track portions 35.

During recording and reproducing, the magnetic head 20 is disposed above the magnetic recording disk 10 so that its magnetic core 21 is separated from the uppermost surface of the magnetic recording disk by a distance d. The uppermost surface of the magnetic recording disk in this embodiment is the upper surface of the protective layer 18 located on the track 33 as shown in FIG. 6. The magnetic core 21 acts as a record/reproduce means for selectively applying a magnetic field to the magnetic recording disk (during recording) and detecting changes in the magnetic field generated by the magnetic recording disk (during reproduce). When the magnetic disk 10 stops, the entire area of the lower surface of the slider member 22 of the magnetic head 20 can come into contact with the uppermost surface of the magnetic disc 10. The entire surface of the magnetic head 20 or the slider member 22 has a width Wc in a direction parallel to the radial direction of the magnetic recording disk when the magnetic head 20 is disposed for recording on or reproducing from the magnetic recording disk. It should be noted that the total width $W_c$ of the slider where the magnetic recording head 20 can contact the magnetic recording disk 2 is larger than the sum of the width $W_1$ of a track 33 plus the gap $G_1$ of an inter-track portion 35 (i.e., $W_c > W_1 + G_1$). The tracks 33 thus periodically arranged by the interval of $W_1 + G_1$ smaller than the width Wc of the magnetic head 20 can prevent the magnetic head 20 from adhering to the magnetic recording disk 10 when the disk is stationary.

The core 21 of the magnetic head 20 has a width W in a direction parallel to the radial direction of the magnetic recording disk when the magnetic head 20 is disposed for recording on or reproducing from the magnetic recording disk. It should be noted that the sum of one width $W_1$ distance and two gap $G_1$ distances is longer than the width W of the core 21 of the magnetic head (i.e., $W < W_1 + 2G_1$).

When the magnetic disk 10 rotates for recording operation or reproducing operation, the magnetic head 20 lifts away from the recording disk 10, so that the lower surface of the magnetic head 20 may be distant from the uppermost surface of the magnetic disc 10 with the distance d, as shown in FIG. 6. It should be further noted that the film thickness t of the non-magnetic thin film 14 is greater than the distance d separating the magnetic head 20 from the magnetic recording disk 10. As shown in FIG. 6, the thickness t is defined by the distance between the upper flat surface US of the track 33 and the lower surface LS of the inter-track portion 35. In other words, the thickness t is the amount by which presence of the non-magnetic thin film 14 raises the upper surface of the tracks 33.

Actual dimensions of width $W_1$ and gap $G_1$ are determined relative to the actual dimension of a magnetic head 20 for recording on or reproducing from the magnetic recording disk 10. Because the width W of the core 21 is generally in a range of about 6 µm to about 10 µm and the entire width Wc of the head 20 is generally in a range of about 2 mm to about 3 mm, when width $W_1$ is 10 µm or less, gap $G_1$ is preferably 5 µm or less. When width $W_1$ is 6 µm or less, gap $G_1$ is preferably 3 µm or less. When width $W_1$ is 3.5 µm or less, gap $G_1$ is preferably 1.5 µm or less. When width $W_1$ is 1.6 µm or less, gap $G_1$ is preferably 0.8 µm or less. Of course, these width $W_1$ and gap $G_1$ should satisfy the above-described inequalities $W_1 > G_1$, $W_1 + G_1 < W_c$, and $W_1 + 2G_1 > W$.

Actual dimensions of thickness t is determined relative to the actual dimension of distance d separating the magnetic head from the magnetic recording disk 10. Because distance d is generally about 0.1 µm or less, thickness t is preferably about 0.2 µm. For example, when distance d is in a range of 0.1 µm or less to 0.075 µm or less, thickness t of about 0.2 µm is preferable.

Figure 7:
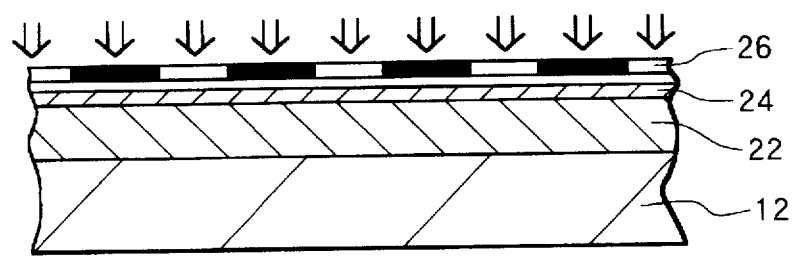
FIGS. 7 (a) through 7 (d) are cross-sectional views showing progressive steps in a production method of the magnetic recording disk shown in FIG. 6.
Figure 7:
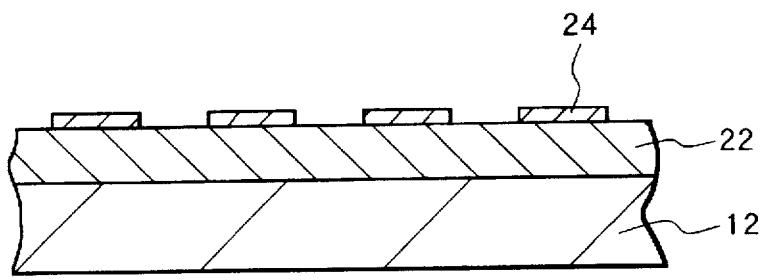
Figure 7:
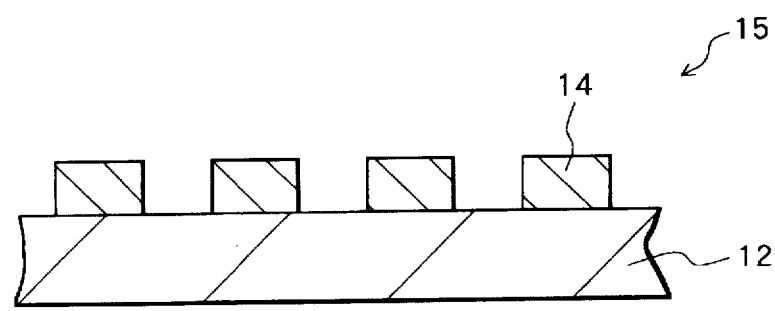
Figure 7:
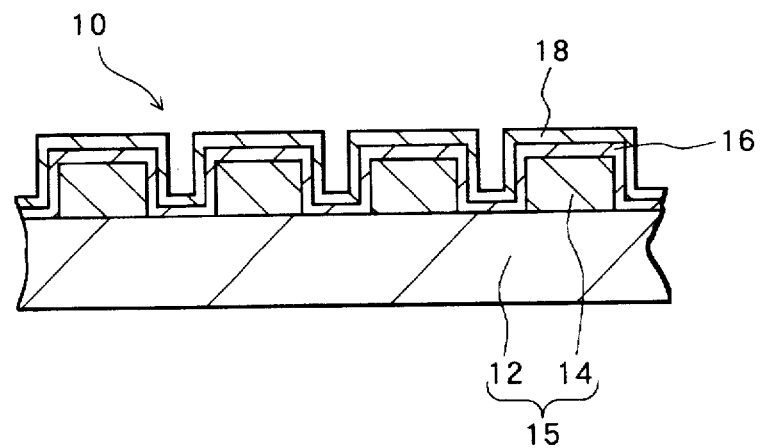

Next, a method for producing the magnetic recording disk 10 of this embodiment will be explained while referring to FIGS. 7 (a) through 7 (d). As shown in FIG. 7 (a), a non-magnetic thin film 22, made from tantalum or other suitable material, is formed on a disc-shaped substrate 12, made from a material with a smooth surface such as glass, using sputtering, vapor metal deposition, or other well-known film forming technique. A photoresist 24 is then spin coated onto the non-magnetic thin film 22. A mask 26 is placed in intimate contact with the photoresist 24. The mask 26 has a predetermined spiral pattern or concentric-circle pattern formed from bands with band widths $W_1$ and inter-band gaps $G_1$.

The center of the pattern on the mask 26 is aligned with the center of the disc-shaped substrate 12. Exposure is performed by illuminating the photoresist 24 with ultraviolet light through the mask 26.

After exposure, developing is performed to remove the portion of the photoresist 24 illuminated by the ultraviolet light. As shown in FIG. 7 (b), the remaining photoresist 24 has received the pattern of the mask 26. Portions of the non-magnetic thin film 22 corresponding to the removed portions of the photoresist 24 are then etched to a predetermined depth using an appropriate solvent, such as an acid or an alkali, or dry etching techniques, such as plasma etching or ion etching. After etching is completed, the remaining photoresist 24 is removed, using, for example, a solvent, to form the non-magnetic thin film 14 shown in FIG. 7 (c).

In more concrete terms, portions of the non-magnetic thin film 22 between the photoresist shown in FIG. 7 (b) are etched completely away until the substrate 12 is exposed. By forming the substrate 12 and the non-magnetic thin film 22 from different materials and by selecting an etching operation that can etch the non-magnetic thin film 22 but not etch the substrate 12, the non-magnetic thin film 22 can be etched away without damaging the substrate 12. For example, if the substrate 12 is formed from glass and the non-magnetic thin film 22 from tantalum, plasma etching method with $CF_4+O_2$ (flon 14) can be used to etch the tantalum 22 without etching the glass substrate 12. Similarly, if the substrate 12 is formed from glass and the non-magnetic thin film 22 from chromium, etching with the use of $CCl_4+O_2$ can selectively remove the chromium 22 without etching into the glass substrate 12.

Because the non-magnetic thin film 22 is formed from an etchable material and the substrate 12 from an unetchable material as described above, the surface of the substrate 12 is not etched, and so remains smooth. Said differently, unnecessary portions of the non-magnetic thin film 22 can be selectively completely etched away in the thickness direction. This eliminates one source of noise during reproduction, roughness, so a good reproduce signal can be obtained. In addition, with this method, complicated etching control becomes unnecessary so deviations can be avoided and a uniform surface can be provided to the magnetic recording disk 10. Consequently, stable air currents are produced and head crashes are prevented during recording or reproducing. Adherence between the magnetic head and the magnetic recording disk 10 is also prevented. Accordingly, operation speed and recording density can also be improved.

After the support 15 is thus obtained, by forming a magnetic layer 16 and a protective layer 18 on the support 15 using a well-known thin-film forming technique, such as sputtering, a magnetic recording disk 10 can be formed as shown in FIG. 7 (d).

As shown in FIG. 6, the magnetic layer 16 and the protective layer 18 take on the shape of the non-magnetic thin film 14. Because the band shapes of the non-magnetic thin film 14 are formed by etching processes which are extremely precise and which have excellent reproducibility, the upper surface US of the non-magnetic thin film 14 becomes smooth compared to the surface formed by the polishing processes in the texture process shown in FIG. 1. Accordingly, the magnetic layer 16 also becomes smooth and uniform. The uppermost surface of the protective layer 18 becomes also smooth compared to the peaks on the conventionally-formed surface as exemplified by the difference between the abruptly protruding high peak A and the low peak B shown in FIG. 1. Therefore, the distance d at which the magnetic head 20 travels over the magnetic recording disk 10 can be reduced, so that the recording density in the circumferential direction can be increased.

The tracks 33 formed from the non-magnetic thin film 14 are formed into coaxially circular or spiral patterns. Therefore, the magnetic layer 16 taking on the shape of the non-magnetic thin film 14 has good magnetic anisotropy in the circumferential direction. That is, the magnetic layer 16 can present a hysterisis loop that has a sharp angular form with respect to a magnetizing force in the circumferential direction.

The farther the magnetic core 21 is from a magnetic medium 10, the smaller the signal reproduced from the magnetic medium. The lower surface LS in the inter-track portion 35 is farther distant from the core 21 than the upper flat surface US in the track 33. Accordingly, the signal reproduced from the magnetic layer 16 located on the lower surface LS becomes much smaller than the signal reproduced from the magnetic layer 16 located on the upper flat surface US. Thus, the signal reproduced from the magnetic layer 16 in the inter-track portion 35 will only slightly affect the signal produced when reproducing the magnetic recording disk 10. Because the sum of one width $W_1$ distance and two gap $G_1$ distances is longer than the width W of the core 21 (i.e., $W<W_1+2G_1$), the magnetic core 21 is disposed over only the track to be recorded or reproduced, as shown in FIG. 6, and does not span to adjacent tracks. Consequently, there will be no increase in cross talk.

According to the present invention, because the thickness t of the non-magnetic thin film 14 is formed larger than the distance d separating the magnetic head from the non-magnetic thin film 14, the signal produced from the magnetic layer 16 in the inter-track portion 35 will only slightly affect the signal produced when reproducing the magnetic recording disk 10. Therefore, fluctuations in the strength of the reproduction signal caused by irregular thickness t of the non-magnetic thin film 14 are also reduced compared to conventional magnetic recording disks. Because the lower surfaces LS in the inter-track portions 35 are thus greatly separated from the magnetic head, the signal produced from the magnetic layer 16 located on the lower surfaces LS in the inter-track portions 35 is weak. Therefore, even if the non-magnetic thin film 14 is formed with an uneven distribution in its thickness t, fluctuations this causes in the strength of the reproduce signal are minimal.

Additionally, in the present invention, the width $W_1$ of the tracks 33 is greater than the gap $G_1$ of the inter-track portions 35. Accordingly, the surface area of the magnetic layer 16 on the non-magnetic thin film 14 increases, so that the surface area of the magnetic layer 16 used for recording and for reproducing can be increased. Therefore, it is possible to obtain a good reproduce output.

Because sum of the width $W_1$ distance and the gap $G_1$ distances is smaller than the total width Wc of the magnetic head 20 (i.e., $Wc>W_1+G_1$), it is possible to prevent the magnetic head from adhering to the surface of the magnetic recording disc while it is stationary.

The magnetic recording disk according to the first preferred embodiment can be modified in various ways while still obtaining the above described effects.

For example, there are no particular limitations for the width $W_1$ of tracks 33 or for the inter-track distance provided by the gap $G_1$ of the inter-track portions 35 as long as the provided dimensions sufficiently prevent the head from adhering to the surface of the magnetic recording disk 10. Although there are no particular limitations to the film thickness t of the non-magnetic thin film 14, it is preferable for the thickness t of the non-magnetic thin film 14 to be greater than the distance d separating the magnetic head 20 from the magnetic recording disk 10.

Figure 8:
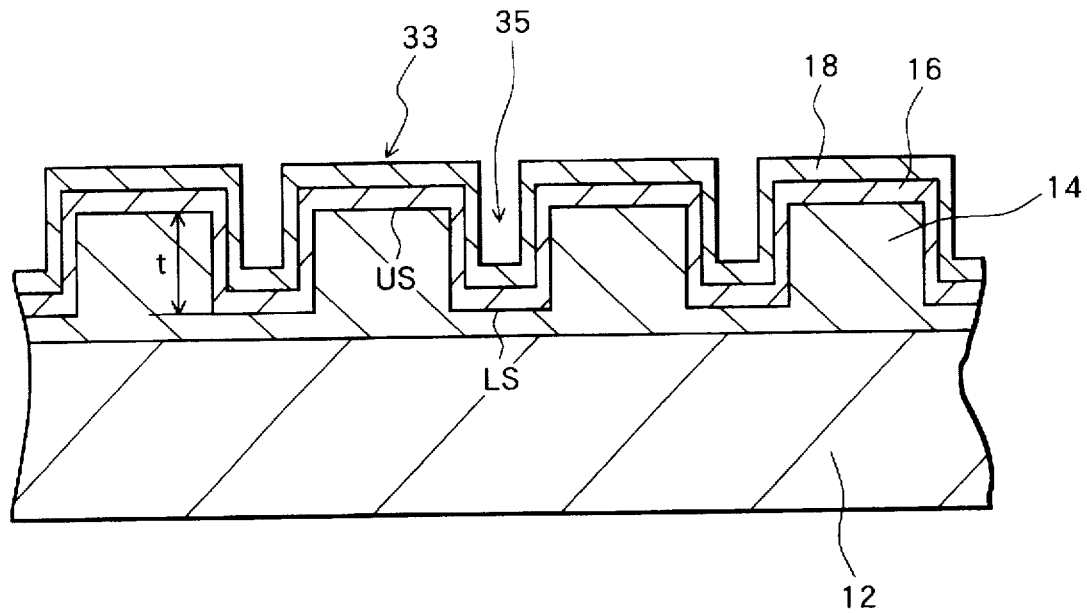
FIG. 8 is a cross-sectional view showing a magnetic recording disk according to a modification of the first preferred embodiment.

For example, although the production method described while referring to FIG. 7 (c) describes the non-magnetic thin film 14 as entirely removed to the substrate 12 at inter-track portions 35, some of the non-magnetic thin film 14 can be retained at this step of the process, as shown in FIG. 8, as long as the thickness t of tracks 33 is greater than the distance d separating the magnetic head 20 from the upper surface of the magnetic recording disk 10.

Figure 9:
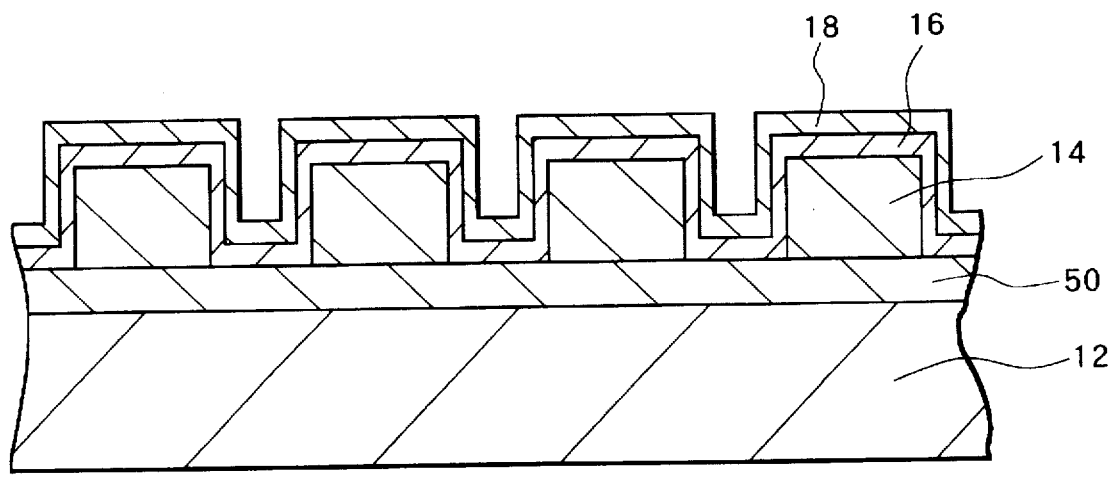
FIG. 9 is a cross-sectional view showing a magnetic recording disk according to another modification of the first preferred embodiment.

Also, the non-magnetic thin film 14 need not be formed directly on the substrate 12 but can instead be formed on an interposed layer 50 as shown in FIG. 9. Forming the interposed layer 50 from, for example, a chromium thin film, will provide better intimate contact of the magnetic layer 16.

Figure 10:
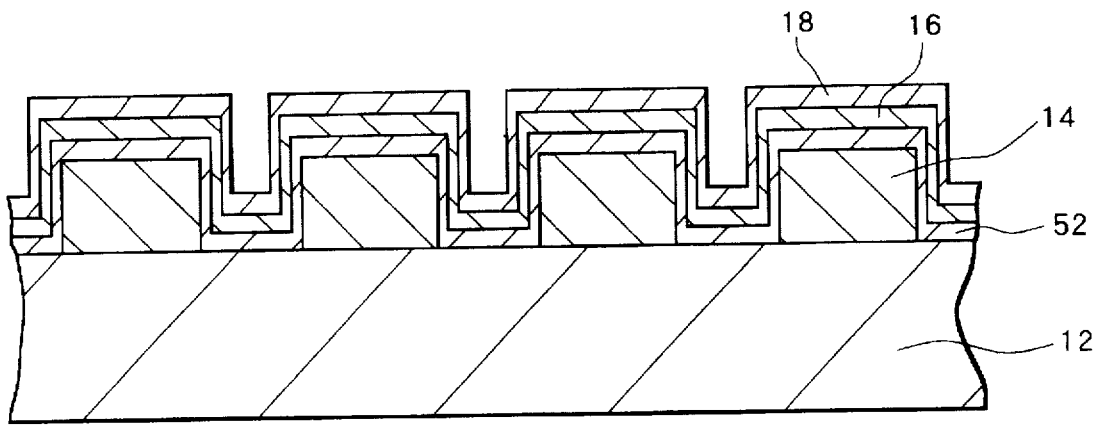
FIG. 10 is a cross-sectional view showing a magnetic recording disk according to still another modification of the first preferred embodiment.

In order to provide a smoother more uniform surface on which to form the magnetic layer 16 and more completely suppress the fluctuations in the magnetic characteristic of the magnetic layer 16, a smoothing layer 52 may be formed so as to cover the substrate 12 and the non-magnetic film 14 as shown in FIG. 10. Forming the smoothing layer will also provide better intimate contact of the magnetic layer 16.

Figure 11:
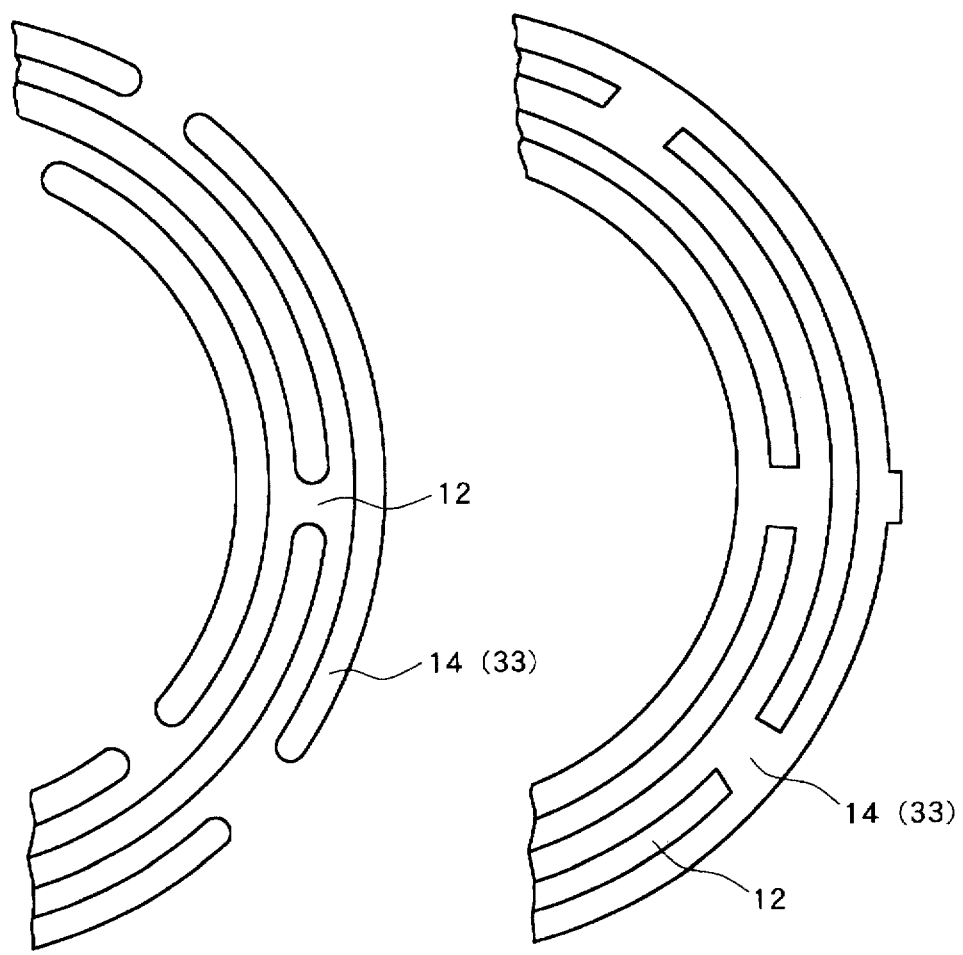
FIG. 11 (a) is a top view showing a possible pattern for tracks of the magnetic recording disk according to the first preferred embodiment.

In the above description, the tracks 33 are formed in a concentric circular or a spiral pattern. However, there is no need to form the tracks 33 continuously around the magnetic recording disk 10. The benefits described in the first preferred embodiment, such as preventing the magnetic head 20 from adhering to the magnetic disk 10, can also be obtained by forming the tracks 33 in arc shapes as shown in FIGS. 11 (a) and 11 (b).

As described above, according to the first embodiment, at least a single track is formed in a magnetic recording disk from a single non-magnetic thin film 14 formed to a predetermined width. The magnetic layer takes on the shape of the non-magnetic thin film. Because of this and because the track is flat at its upper surface, the magnetic head can be brought extremely close to the magnetic recording disk. The recording density along the circumferential direction can therefore be greatly increased.

Good reproduce output can be obtained by selecting the width of the track 33 greater than the gap formed by the inter-track portion 35.

The magnetic head will not adhere to the surface of the magnetic recording disk because sum of the width of the track 33 and the gap formed by the inter-track portion 35 is selected to be smaller than the total width of the magnetic head.

Because only a small signal is reproduced from inter-track portions 35, cross talk can be controlled.

Figure 12:
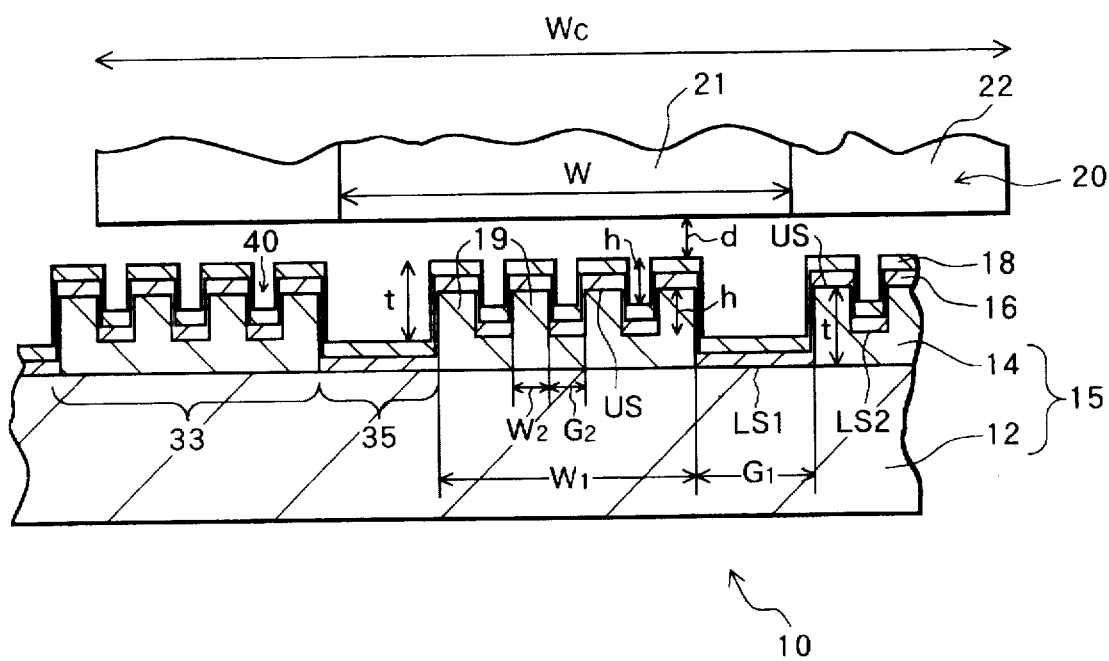
FIG. 12 is a cross-sectional view showing a magnetic recording disk according to a second preferred embodiment of the present invention taken along a plane parallel to a radial direction of the magnetic recording disk.

Next, a magnetic recording disk according to a second preferred embodiment of the present invention will be described. Similar to the magnetic recording head 10 of the first preferred embodiment, as shown in FIG. 12, a magnetic recording disk 10 according to the second preferred embodiment includes a non-magnetic support 15 having a substrate 12 and a non-magnetic thin film 14, a magnetic layer 16 supported on the support 15, and a protective layer 18. A layer of lubricant (not shown), can also be provided on the protective layer 18. The layers of the magnetic recording disk 10 according to the second preferred embodiment can be formed from the materials described for corresponding layers of the magnetic recording disk 10 according to the first preferred embodiment.

As in the first preferred embodiment, the non-magnetic thin film 14 is formed into a plurality of band-shaped tracks 33 juxtaposed in a concentric circular or spiral pattern on the substrate 12. Each track 33 has a width $W_1$. Adjacent tracks 33 are separated by inter-track portions 35. The inter-track portions 35 are provided with a gap $G_1$.

As in the first preferred embodiment, dimensions of width $W_1$ and gap $G_1$ are determined relative to the dimension of the core 21 of a magnetic head 20 for recording on or reproducing from the magnetic recording disk 10. More specifically, the magnetic core 21 has a width W in a direction parallel to the radial direction of the magnetic recording disk 10 when the magnetic head is disposed for recording on or reproducing from the magnetic recording disk. Width $W_1$ of the track 33 is less than the width W of the core 21 (i.e., $W>W_1$). However, the sum of one width $W_1$ distance and two gap $G_1$ distances is longer than the width W (i.e., $W<W_1+2G_1$).

According to the second preferred embodiment, as shown in FIG. 12, each track 33 of the non-magnetic thin film 14 is provided with a plurality of raised zones 19. The raised zones 19 are formed in bands that follow the contours of the tracks 33. For example, if the tracks 33 are provided in a concentric circular pattern, a plurality of band-shaped raised zones 19 are provided to each particular curved track 33 in a concentric circular pattern that follows the curve of that particular track 33. Similarly, if the tracks 33 are provided in a spiral pattern, a plurality of raised zones 19 are provided to each particular track 33 following the spiral pattern of that particular track 33. Each raised zone 19 has a width $W_2$ in the radial direction of the magnetic recording disk 10. Inter-zone portions 40 are provided so as to separate adjacent raised zones 19 with a gap $G_2$. In this embodiment, not only the inter-track portions 35 but also the inter-zone portions 40 serve to prevent the magnetic head 20 from adhering to the magnetic recording disk 10 when the disk is stationary.

In other words, in this embodiment, the non-magnetic support 15 forms the tracks 33 having the raised zones 19 and the inter-zone portions 40 and the inter-track portions 35. As shown in FIG. 12, each raised zone 19 has an upper flat surface US, each inter-track portion 35 has a first lower surfaces LS1, and each inter-zone portion 40 has a second lower surface LS2. The magnetic layer 16 is formed entirely and uniformly over these surfaces US, LS1 and LS2 so as to be provided entirely over the non-magnetic support 15. The protective layer 18 is provided entirely and uniformly over the magnetic layer 16.

When the magnetic disk 10 rotates for recording operation or reproducing operation, the magnetic head 20 lifts away from the recording disk 10, so that the lower surface of the magnetic head 20 may be distant from the uppermost surface of the magnetic disc 10 with a distance d, as shown in FIG. 12 where the uppermost surface of the magnetic recording disk is the upper surface of the protective layer 18 located on the raised zone 19 on the track 33 as shown in FIG. 12. It should be further noted that the film thickness t of the non-magnetic thin film 14 is greater than the distance d separating the magnetic head 20 from the magnetic recording disk 10. As shown in FIG. 12, the thickness t is defined by the distance between the upper flat surface US of the raised zones 19 of the track 33 and the lower surface LS1 of the inter-track portion 35. In other words, the thickness t is the amount by which presence of the non-magnetic thin film 14 raises the upper surface of the tracks 33.

Examples of actual dimensions of width $W_1$ and gap $G_1$ are the same as those for the first embodiment. Of course, these width $W_1$ and gap $G_1$ should satisfy the above-described inequalities $W_1<W$ and $W_1+2G_1>W$. As examples of actual dimensions of width $W_2$ and gap $G_2$, when $W_2$ is 1 µm or less, gap $G_2$ is preferably 0.6µ or less. When $W_2$ is 0.7 µm or less, gap $G_2$ is preferably 0.3µ or less. Of course, width $W_2$ and gap $G_2$ should be less than width $W_1$. An example of actual dimension of thickness t is the same as that for the first embodiment. An example of actual dimension of height h of the raised zone 19 (i.e., the distance between the upper flat surface US of the raised zone 19 and the lower surface LS2 of the inter-zone portion 40) is preferably in a range of 0.07 µm to 0.02 µm or less.

Figure 13:
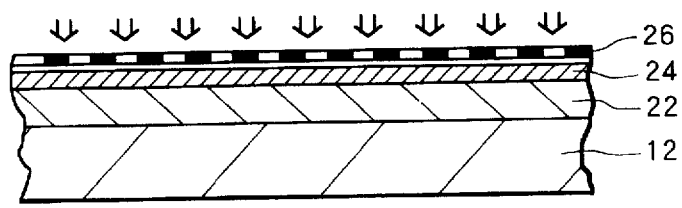
FIGS. 13 (a) through 13 (g) are cross-sectional views showing progressive steps in a production method of the magnetic recording disk shown in FIG. 12.
Figure 13:
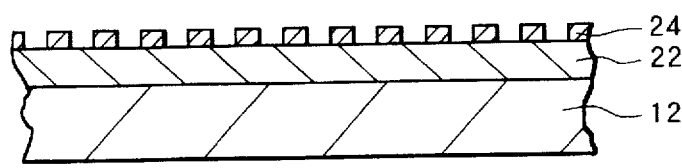
Figure 13:
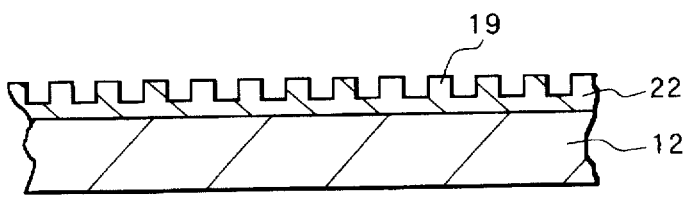
Figure 13:
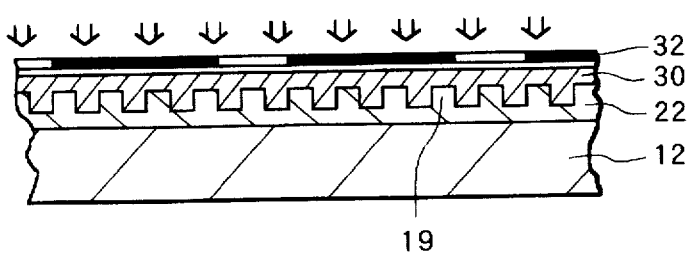
Figure 13:
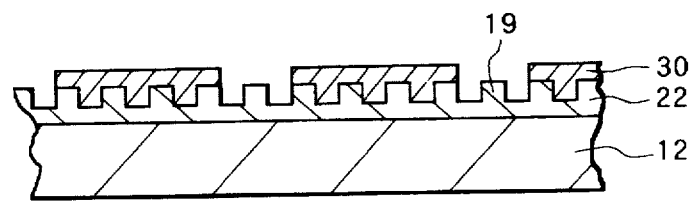
Figure 13:
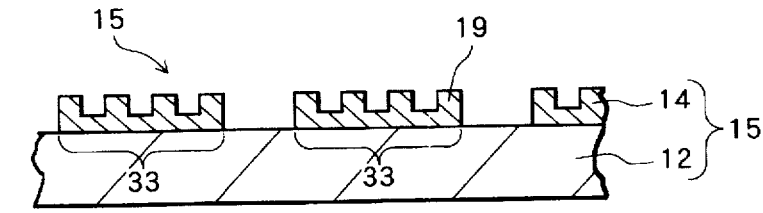
Figure 13:
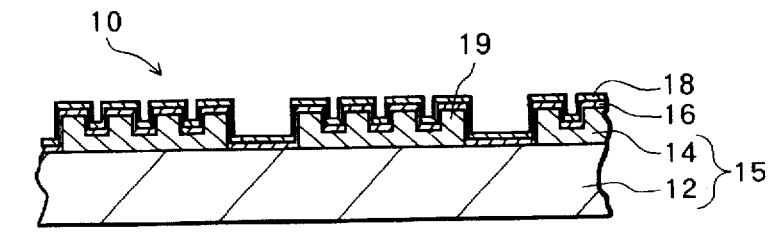

Next, a method for producing the magnetic recording disk 10 of the present embodiment will be explained while referring to FIGS. 13 (a) through 13 (g). As shown in FIG. 13 (a), a non-magnetic thin film 22, made from tantalum or other suitable material, is formed on a substrate 12, made from a material with a smooth surface such as glass, using sputtering, vapor metal deposition, or other well-known film forming technique. A photoresist 24 is then spin coated onto the non-magnetic thin film 22. A mask 26 is placed in intimate contact with the photoresist 24. The mask 26 has a predetermined spiral pattern or concentric-circle pattern, formed from bands with band widths $W_2$ and inter-band gaps $G_2$, the center of which is aligned with the center of the disc-shaped substrate 12. Exposure is performed by illuminating the photoresist 24 with ultraviolet light through the mask 26.

After exposure, developing is performed to remove the portion of the photoresist 24 illuminated by the ultraviolet light. As shown in FIG. 13 (b), the remaining photoresist 24 receives the pattern of the mask 26. Portions of the non-magnetic thin film 22 corresponding to the removed portions of the photoresist 24 are then etched to a predetermined depth using an appropriate solvent, such as an acid or an alkali, or dry etching techniques, such as plasma etching or ion etching. After etching is completed, the remaining photoresist 24 is removed, using, for example, a solvent, to form the raised zones 19 shown in FIG. 13 (c).

The non-magnetic thin film 22 (including the raised zones 19) is then covered with a photoresist 30 formed using spin coating techniques. Next, a mask 32 is placed in intimate contact with the photoresist 30. The mask 32 has a predetermined spiral pattern or concentric-circle pattern, formed from bands with band widths $W_1$ and inter-track gaps $G_1$, the center of which is aligned with the center of the disc-shaped substrate 12. As shown in FIG. 13 (d), exposure is performed by illuminating the photoresist with ultraviolet light through the mask 32.

After exposure, developing is performed to remove the portion of the photoresist 30 illuminated by the ultraviolet light, leaving the photoresist 30 formed with the same pattern as that of the mask 32 as shown in FIG. 13 (e). Portions of the non-magnetic thin film 22 corresponding to the removed portions of the photoresist 30 are completely etched using an appropriate solvent, such as an acid or an alkali, or dry etching techniques, such as plasma etching or ion etching. After etching is completed, the remaining photoresist 30 is removed, using, for example, a solvent, to form the non-magnetic thin film 14 into the tracks 33 shown in FIG. 13 (f). This produces the support 15 for the magnetic recording disk 10. Because etching processes are extremely precise and have excellent reproducibility, the non-magnetic thin film 14 produced through the etching process may have a desired shape and a desired dimension with high accuracy. By forming a magnetic layer 16 and a protective layer 18 on the support 15 using a well-known thin-film forming technique, such as sputtering, a magnetic recording disk 10 can be formed as shown in FIG. 13 (g).

As shown in FIG. 12, the magnetic layer 16 takes on the shape of the non-magnetic thin film 14. The surface of the magnetic recording disk 10, the raised zones 19 in particular, is smooth compared to the surface formed by the polishing processes in the texture process of FIG. 1. Therefore, the distance d at which the magnetic head 20 travels over the magnetic recording disk 10 can be reduced, so that the recording density can be increased.

The non-magnetic thin film 14 and the raised zones 19 provided thereto are formed into coaxially circular or spiral patterns. Therefore, magnetic anisotropy is obtained in the circumferential direction so that the magnetic layer 16 may have a hysterisis loop of a sharp angular form in the circumferential direction.

The farther a magnetic core is from a magnetic medium, the smaller the signal recorded in or reproduced from the magnetic medium. Because the lower surfaces LS1 in the inter-track portions 35 are greatly separated from the magnetic head by the distance d+t, the signal produced from the magnetic layer 16 located on the lower surfaces LS in the inter-track portions 35 is weak. Because the thickness t of the non-magnetic thin film 14 is formed larger than the distance d separating the magnetic head from the non-magnetic thin film 14, the signal produced from the magnetic layer 16 in the inter-track portion 35 will only slightly affect the signal produced when reproducing the magnetic recording disk 10. Because the signal of the track 33 thus dominates during recording and reproducing, there will be no increase in cross talk as long as the magnetic core 21 is disposed over only the track to be recorded or reproduced, as shown in FIG. 12, and does not span to adjacent tracks. Consequently, as long as the sum of one width $W_1$ distance and two gap $G_1$ distances is longer than the width W of the core 21 (i.e., $W<W_1+2G_1$), the density of tracks can be increased by reducing the width $W_1$ narrower than width W.

Various modifications can be made to the magnetic recording disk 10 as described in the second preferred embodiment while still obtaining the same effects of the present embodiment. For example, as described in the first preferred embodiment, there are no particular limitations for the width $W_1$ of tracks 33 or for the inter-track distance provided by the gap $G_1$ of the inter-track portions 35. There are also no particular limitations to the width $W_2$ of the raised zones 19 or the inter-zone distance formed by the gap $G_2$ as long as the provided dimensions sufficiently prevent the head from adhering to the surface of the magnetic recording disk 10. Although there are no particular limitations to the height of raised portions 19 or film thickness t of the non-magnetic thin film 14, as described in the first preferred embodiment, it is preferable for the thickness t of the non-magnetic thin film 14 to be greater than the distance d separating the magnetic head 20 from the magnetic recording disk 10.

Figure 14:
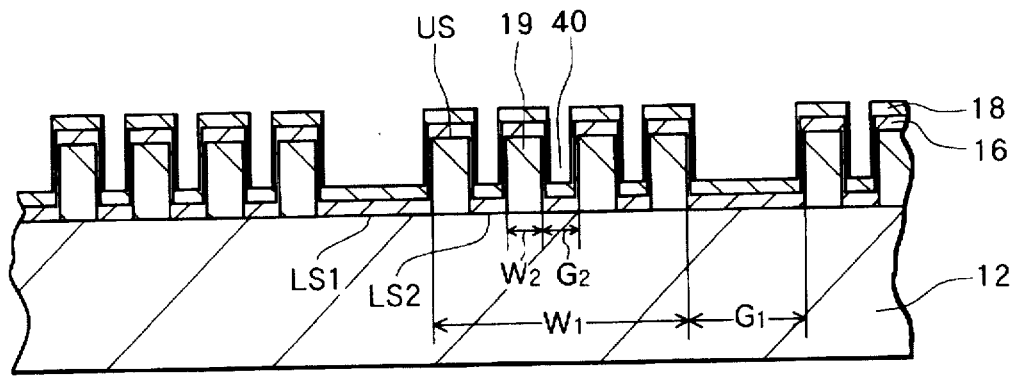
FIG. 14 is a cross-sectional view showing a magnetic recording disk according to a modification of the second preferred embodiment.

By forming the non-magnetic thin film 14 from an etchable material and the substrate 12 from an unetchable material, portions of the non-magnetic thin film 14 between the photoresist 24 shown in FIG. 13 (b) can be etched completely away until the substrate 12 is exposed. This would provide raised zones 19 as shown in FIG. 14. Because the surface of the substrate 12 is not etched, and so remains smooth, roughness can be eliminated so a good reproduce signal can be obtained. With this method, complicated etching control is unnecessary so a uniform surface can be provided to the magnetic recording disk 10. Because the lower surface LS2 of the inter-track portions 40 are greatly separated from the magnetic head by the distance of t+d, the signal produced from the magnetic layer 16 located on the lower surface LS2 is weak. Therefore, even if the non-magnetic thin film 14 is formed with an uneven distribution in its thickness t, fluctuations this causes in the strength of the reproduce signal are minimal.

Figure 15:
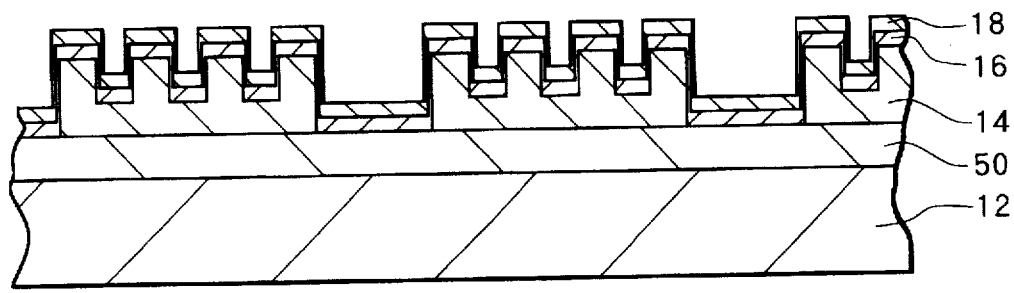
FIG. 15 is a cross-sectional view showing a magnetic recording disk according to another modification of the second preferred embodiment.

The non-magnetic thin film 14 need not be formed directly on the substrate 12 but can instead be formed on an interposed layer 50 as shown in FIG. 15. Forming the interposed layer 50 from, for example, a chromium thin film, can improve intimate contact of the magnetic layer 16.

Figure 16:
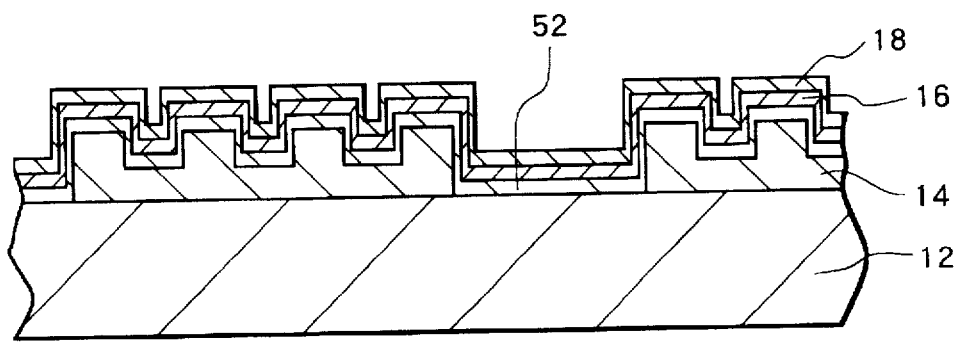
FIG. 16 is a cross-sectional view showing a magnetic recording disk according to still another modification of the second preferred embodiment.

A smoothing layer 52 can be provided so as to cover the substrate 12 and the non-magnetic thin film 14 as shown in FIG. 16. The smoothing layer 52 provides a smoother more uniform surface on which to form the magnetic layer 16, thereby preventing fluctuations in the magnetic characteristic of the magnetic layer 16 and also improving intimate contact of the magnetic layer 16.

Figure 17:
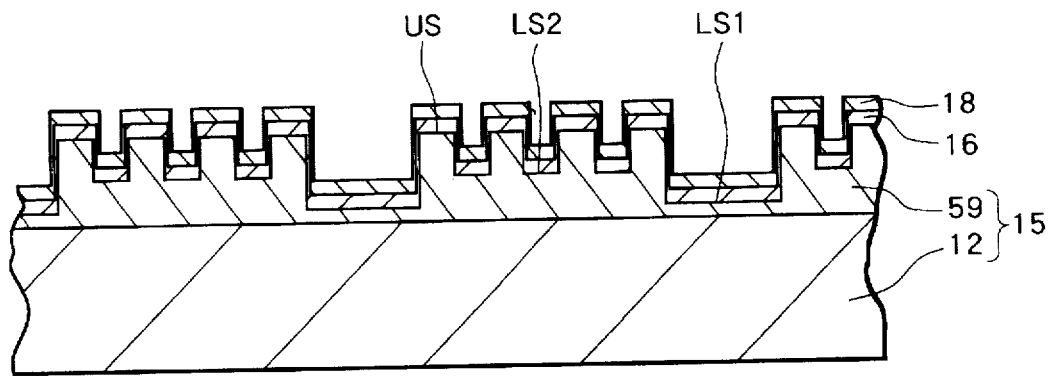
FIG. 17 is a cross-sectional view showing a magnetic recording disk according to a further modification of the second preferred embodiment.

Portions of the non-magnetic thin film 22 corresponding to the removed portions of the photoresist 30 shown in FIG. 13 (e) need not be completely etched to the substrate 12 as shown in FIG. 13 (f). As long as the surface of the non-magnetic thin film 14 is provided with the shape of the tracks 33, like the non-magnetic thin film 59 shown in FIG. 17, the benefits described in the present embodiment can be obtained.

Figure 18:
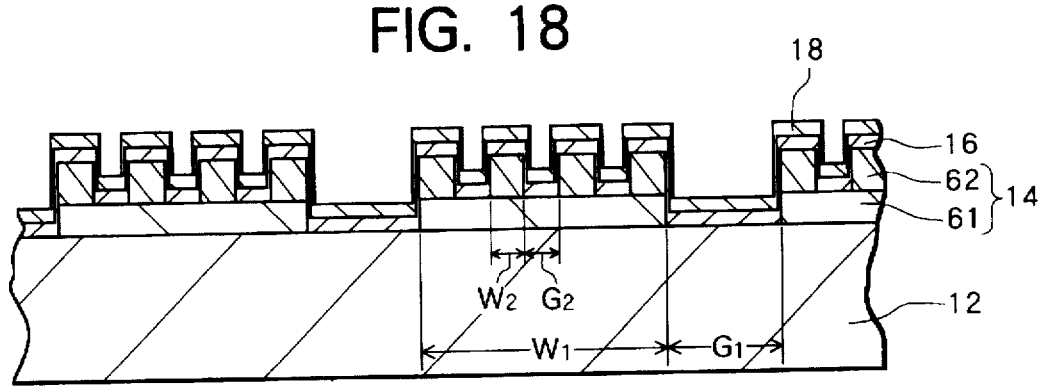
FIG. 18 is a cross-sectional view showing a magnetic recording disk according to a still further modification of the second preferred embodiment.

The non-magnetic thin film 14 need not be formed from a single material, but can instead be formed from a plurality of materials. For example, as shown in FIG. 18 the tracks 33 can be formed from a different material than the raised zones 19. In this example, tantalum raised zones 62 with width $W_2$ and inter-zone gap $G_2$ are provided on aluminum non-magnetic thin film 61 formed to width $W_1$ and with inter-track gap $G_1$. As is mentioned when describing the magnetic recording disk shown in FIG. 14, using materials with different etching characteristics for different layers of the magnetic recording disk allows layers to be etched to the border with an underlying layer. Because there is no need to stop the etching process in the middle of a layer, controlling the etching depth becomes unnecessary so that production of the raised zones 62 becomes particularly easy. This increases overall reliability and reproducibility of the magnetic recording disk.

Other methods can be used to produce the magnetic recording disk than the method described while referring to FIGS. 13 (a) through (g). The method shown in FIGS. 13 (a) through (g) describes first forming the raised zones 19 with width $W_2$ and inter-zone gap $G_2$ and then the tracks 33 with width $W_1$ and inter-track gap $G_1$. However, first a non-magnetic thin film 22 can be processed with width $W_1$ and gap $G_1$ and raised zones with width $W_2$ and inter-zone gap $G_2$ can be formed afterwards.

Figure 19:
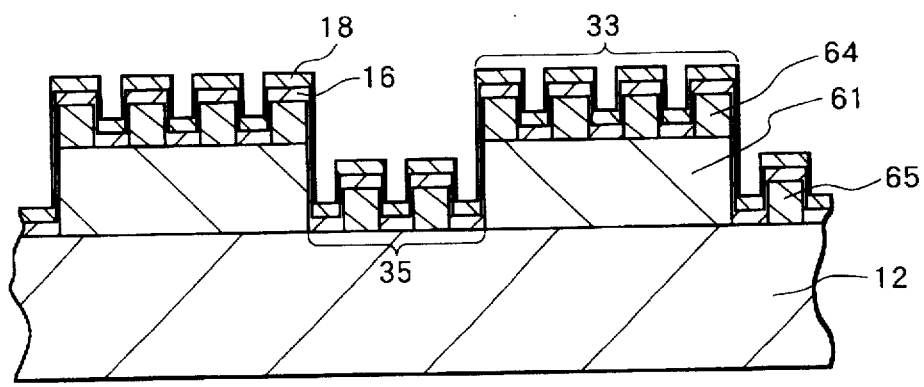
FIG. 19 is a cross-sectional view showing a magnetic recording disk according another modification of the second preferred embodiment.

Similarly to the method described while referring to the magnetic recording disk shown in FIG. 18, in a separate method first the tracks 33 with width $W_1$ and inter-track gap $G_1$ can be formed from a non-magnetic thin film 61 of, for example, aluminum, as shown in FIG. 19. Next, raised zones 64 (raised zones 19) with width $W_2$ and inter-zone gap $G_2$ can be formed from a thin film of, for example, tantalum formed on the non-magnetic thin film 61. However, raised zones 65 are also formed in the inter-track portions 35 when forming the raised zones 64. Rather than removing the raised zones 65, which would require another etching process, the raised zones 65 can be sufficiently separated from the magnetic head, that is, to sufficiently reduce the signal reproduced from the raised zones 65, by controlling the thickness of the non-magnetic thin film 61. In this way, signals reproduced from raised zones 65 are sufficiently weaker than those reproduced from the track 33. Cross talk is thus sufficiently controlled.

Figure 20:
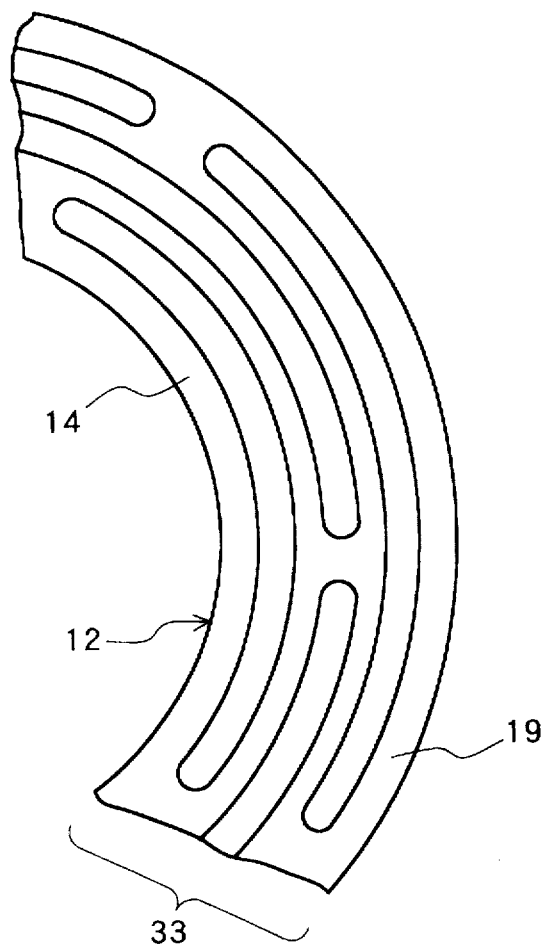
FIG. 20 (a) is a top view showing a possible pattern for tracks of the magnetic recording disk according to the second preferred embodiment.
Figure 20:
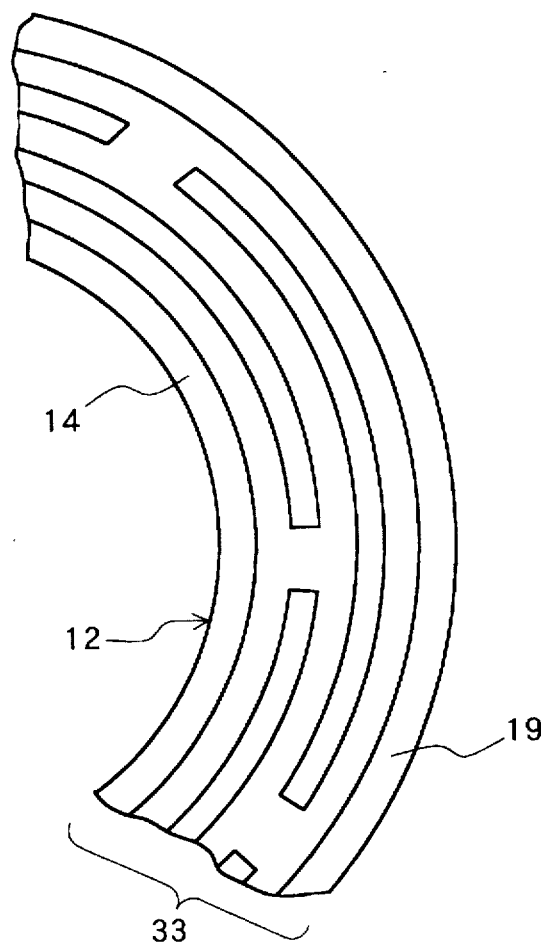

Although the raised zones 19 provided to the non-magnetic thin film 14 are described in the second embodiment as being formed in a concentric circular shape or a spiral shape, the benefits described in the preferred embodiment can also be obtained by forming the raised zones 19 in arc shapes as shown in FIGS. 20 (a) and 20 (b).

As described above, according to the second preferred embodiment, at least a single track is formed in a magnetic recording disk from a single non-magnetic thin film 14 formed to a predetermined width. Each track is separated by a predetermined distance so that the width of the track can be made narrower than the width of the magnetic core. The track density can consequently be increased and the recording density further increased. The raised zones 19 and the inter-zone portions 40 will prevent the magnetic head from adhering to the surface of the magnetic recording head.

Because only a small signal is reproduced from inter-track portions 35, cross talk can be controlled.

Because the track 33 and the raised zone 19 extend in the circumferential direction, the magnetic layer 16 formed on the track 33 and the raised zone 19 may have a magnetic anisotropy in the circumferential direction to thereby present a hysterisis loop of a sharp angular form in the circumferential direction.

Next, a magnetic recording disk 10 according to examples of a third preferred embodiment of the present invention will be described.

Figure 21:
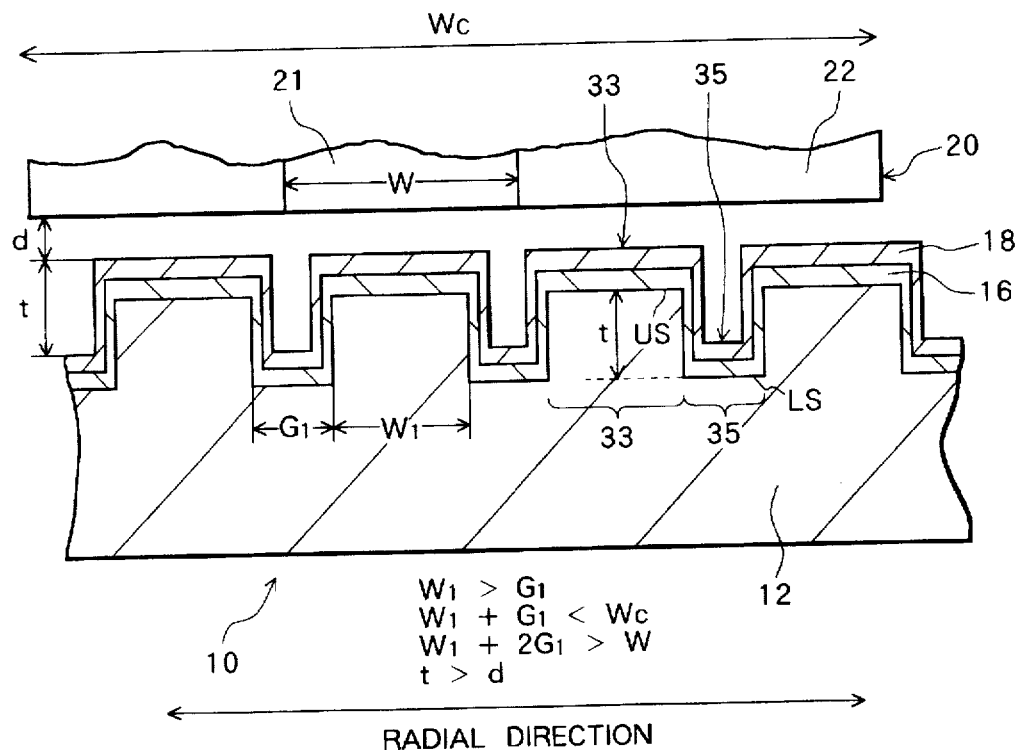
FIG. 21 is a cross-sectional view showing a magnetic recording disk according to first example of a third preferred embodiment of the present invention taken along a plane parallel to a radial direction of the magnetic recording disk.

As shown in FIG. 21, a magnetic recording disc according to a first example of the third preferred embodiment includes a non-magnetic substrate 12, a magnetic layer 16 supported directly on the substrate 12, and a protective layer 18. A layer of lubricant (not shown) can also be provided on the protective layer 18. This appears similar to the magnetic recording disc 10 described in the first preferred embodiment of FIG. 6 except that no non-magnetic thin film 14 is provided. Consequently, the shapes of tracks 33 and inter-track portions 35 are produced by the shape of the substrate 12 rather than the shape of the non-magnetic thin film 14. The dimensional and positional characteristics of the tracks 33 and inter-track portions 35 of the magnetic recording disk 10 of this first example share the dimensional and positional characteristics of the tracks 33 and inter-track portions 35 of the magnetic recording disk 10 of the first preferred embodiment.

That is, the tracks 33 are juxtaposed in a concentric circular or spiral pattern on the substrate 12. Each track 33 has a width $W_1$ in a radial direction of the magnetic recording disk. Adjacent tracks 33 are separated by inter-track portions or grooves 35. The inter-track portions 35 separate adjacent tracks 33 by a gap $G_1$. The width $W_1$ of each track 33 is greater than the gap $G_1$ formed by the inter-track portions 35.

In other words, in this example, the non-magnetic substrate 12 forms the tracks 33 and the inter-track portions 35. As shown in FIG. 21, each track 33 has an upper flat surfaces US, and each inter-track portion 35 has a lower surfaces LS. The magnetic layer 16 is formed entirely and uniformly over these surfaces US and LS so as to be provided entirely over the non-magnetic substrate 12. The protective layer 18 is provided entirely and uniformly over the magnetic layer 16.

Also, the materials used for forming layers of the magnetic recording disk 10 in the third preferred embodiment can be the same as described for forming corresponding layers of the magnetic recording disk 10 described in the first preferred embodiment.

The track height or groove depth t of the substrate 12 is greater than the distance d separating the magnetic head 20 from the magnetic recording disk 10. The distance d in the present embodiment is the distance between the lower surface of the magnetic head 20 and the uppermost surface of the protective layer 16 located on the upper flat surface US of the track 33, as shown in FIG. 21. The track height t in the present embodiment is the distance between the upper flat surface US of the track 33 and the lower surface LS of the inter-track portion 35. In other words, the track height t is the amount by which substrate 12 raises the upper surface of the tracks 33. The width $W_c$ of the area where the magnetic recording head 20 can contact the magnetic recording disk 2 is larger than the sum of the width $W_1$ of a track 33 plus the gap $G_1$ of an inter-track portion 35 (i.e., $W_c > W_1 + G_1$). It should be noted that the sum of one width $W_1$ distance and two gap $G_1$ distances is longer than the width W (i.e., $W < W_1 + 2G_1$) of the core. Examples of actual dimensions of width $W_1$ and gap $G_1$ are the same as those for the first embodiment. Similarly, an example of actual dimension of height t is the same as that of thickness t for the first embodiment.

Next, a magnetic recording disk according to a second example of the third preferred embodiment of the present invention will be described with reference to FIG. 22. Similar to the magnetic recording disk 10 described in the second preferred embodiment of FIG. 12, the magnetic recording disk 10 of the second example of the present embodiment of FIG. 12 includes a non-magnetic substrate 12, a magnetic layer 16 supported directly on the substrate 12, and a protective layer 18. A layer of lubricant (not shown), can also be provided on the protective layer 18.

This appears similar to the magnetic recording disc 10 described in the second preferred embodiment of FIG. 12 except that no non-magnetic thin film 14 is provided. Consequently, the shapes of tracks 33, inter-track portions 35, and raised zones 19 in the second example of the third preferred embodiment are produced by the shape of the substrate 12 rather than the shape of the non-magnetic thin film 14. The dimensional and positional characteristics of the tracks 33 and inter-track portions 35 of the magnetic recording disk 10 of this second example share the dimensional and positional characteristics of the tracks 33 and inter-track portions 35 of the magnetic recording disk 10 of the second preferred embodiment.

For example, the raised zones 19 are formed in bands that follow the contours of the tracks 33. Each raised zone 19 has a width $W_2$ in the radial direction of the magnetic recording disk 10. Inter-zone portions 40 are provided between adjacent raised zones 19 so as to separate adjacent raised zones 19 with a gap $G_2$.

In other words, in this example, the non-magnetic substrate 12 forms the tracks 33 having the raised zones 19 and the inter-zone portions 40 and the inter-track portions 35. As shown in FIG. 22, each raised zone 19 has an upper flat surfaces US, each inter-track portion 35 has a first lower surfaces LS1, and each inter-zone portion 40 has a second lower surfaces LS2. The magnetic layer 16 is formed entirely and uniformly over these surfaces US, LS1 and LS2 so as to be provided entirely over the non-magnetic substrate 12. The protective layer 18 is provided entirely and uniformly over the magnetic layer 16.

The layers of the magnetic recording disk 10 according to this example can be formed from the materials described for corresponding layers of the magnetic recording disk 10 according to the second preferred embodiment.

The track height or groove depth t of the substrate 12 is greater than the distance d separating the magnetic head 20 from the magnetic recording disk 10. The distance d in the present embodiment is the distance between the lower surface of the magnetic head 20 and the uppermost surface of the protective layer 16 located on the upper flat surface US of the track 33, as shown in FIG. 22. The track height t in the present embodiment is the distance between the upper flat surface US of the raised zone 19 of the track 33 and the lower surface LS1 of the inter-track portion 35. In other words, the track height t in the present embodiment is the amount by which substrate 12 raises the upper surface of the raised zones 19 of the tracks 33. Track width $W_1$ is less than the width W of the core (i.e., $W > W_1$). However, the sum of one width $W_1$ distance and two gap $G_1$ distances is longer than the width W (i.e., $W < W_1 + 2G_1$) of the core. Examples of actual dimensions of width $W_1$ and gap $G_1$ and width $W_2$ and gap $G_2$ are the same as those for the second embodiment. Similarly, examples of actual dimensions of height t and height h (i.e., the distance between the upper flat surface US of the raised zone 19 and the lower surface LS2 of the inter-zone portion 40) are the same as those of thickness t and height h for the second embodiment.

Figure 23:
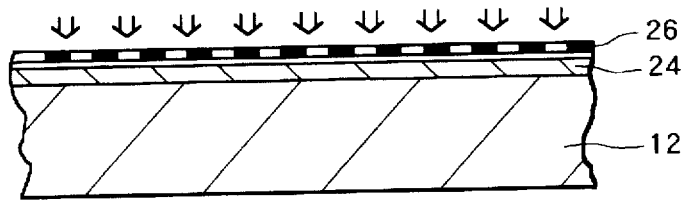
FIGS. 23 (a) through 23 (g) are cross-sectional views showing progressive steps in a production method of the magnetic recording disks shown in FIGS. 21 and 22.
Figure 23:
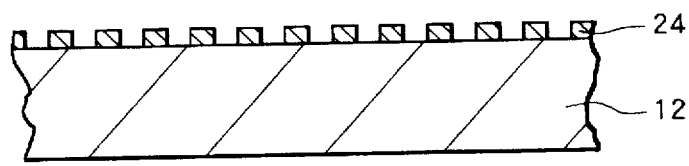
Figure 23:
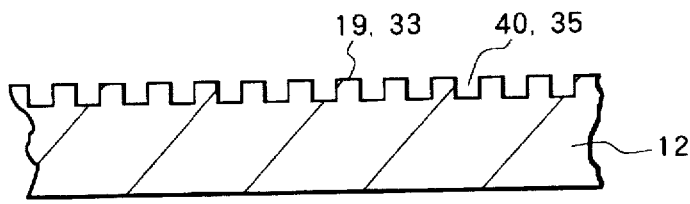
Figure 23:
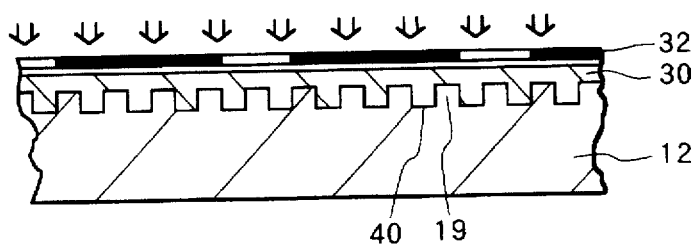
Figure 23:
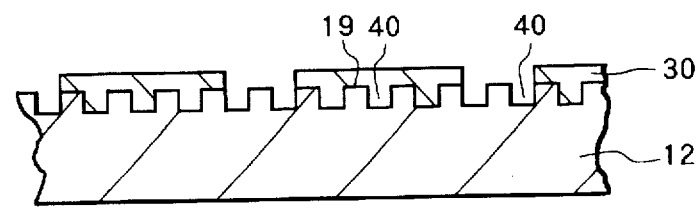
Figure 23:
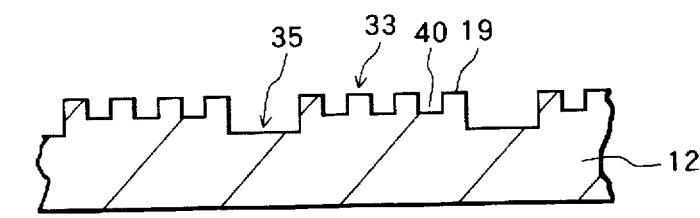
Figure 23:
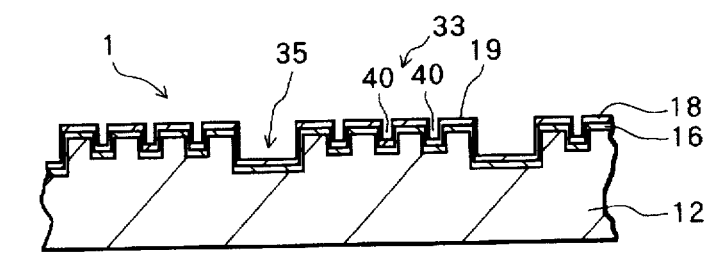

Next, a method for producing the magnetic recording disk 10 according to both of the first and second examples of the third preferred embodiment will be explained while referring to FIGS. 23 (a) through 23 (g). As shown in FIG. 23 (a), a photoresist 24 is spin coated onto the non-magnetic substrate 12. A mask 26 is placed in intimate contact with the photoresist 24. The mask 26 has a predetermined spiral or concentric-circle pattern, formed from bands with band widths $W_2$ and inter-band gaps $G_2$ when producing the magnetic recording disk 10 described in the second example, or from bands with band widths $W_1$ and inter-band gaps $G_1$ when producing the magnetic recording disk 10 described in the first example. Exposure is performed by illuminating the photoresist 24 with ultraviolet light through the mask 26.

After exposure, developing is performed to remove the portion of the photoresist 24 illuminated by the ultraviolet light. As shown in FIG. 23 (b), the remaining photoresist 24 has received the pattern of the mask 26. Portions of the substrate 12 corresponding to the removed portions of the photoresist 24 are then etched to a predetermined depth using an appropriate solvent, such as an acid or an alkali, or dry etching techniques, such as plasma etching or ion etching. After etching is completed, the remaining photoresist 24 is removed, using, for example, a solvent, to form the inter-track grooves 35 for defining therebetween the tracks 33 (when the magnetic recording disk 10 of the first example is to be formed) or the inter-zone grooves 40 for defining therebetween the raised zones 19 (when the magnetic recording disk 10 of the second example is to be formed) shown in FIG. 23 (c).

If the magnetic recording medium 10 of the first example is to be formed, the magnetic layer 16 and the protective layer 18 are then formed on the substrate 12 to form the magnetic recording medium 10 shown in FIG. 21.

If the magnetic recording medium 10 of the second example is to be formed, the substrate 12 is then covered with a photoresist 30 formed using spin coating techniques. Next, a mask 32 is placed in intimate contact with the photoresist 30. The mask 32 has a predetermined spiral pattern or concentric-circle pattern, formed from bands with band widths $W_1$ and inter-band gaps $G_1$, the center of which is aligned with the center of the disc-shaped substrate 12. As shown in FIG. 23 (d), exposure is performed by illuminating the photoresist with ultraviolet light through the mask 32.

After exposure, developing is performed to remove the portion of the photoresist 30 illuminated by the ultraviolet light, leaving the photoresist 30 formed with the same pattern as that of the mask 32 as shown in FIG. 23 (e). Portions of the substrate 12 corresponding to the removed portions of the photoresist 30 are etched using an appropriate solvent, such as an acid or an alkali, or dry etching techniques, such as plasma etching or ion etching. After etching is completed, the remaining photoresist 30 is removed, using, for example, a solvent, to form the substrate 12 into the inter-track grooves 35 for defining therebetween the tracks 33 shown in FIG. 23 (f). This produces the substrate 12 for the magnetic recording disk 10. By forming a magnetic layer 16 and a protective layer 18 on the substrate 12 using a well-known thin-film forming technique, such as sputtering, the magnetic recording disk 10 of the second example can be formed as shown in FIG. 23 (g).

Figure 22:
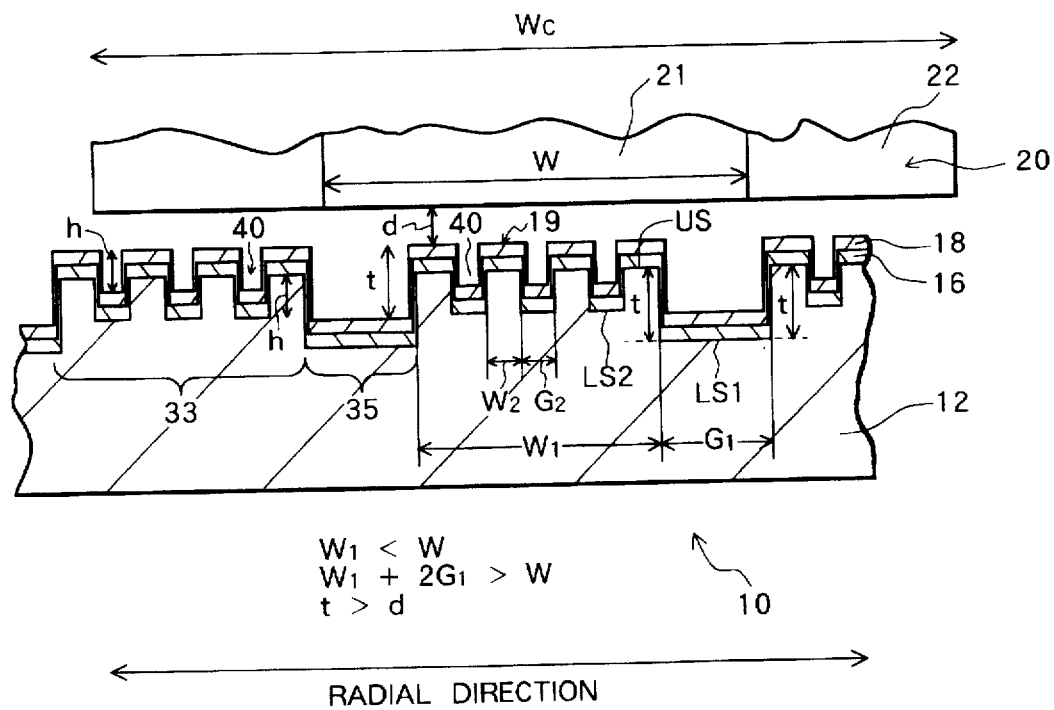
FIG. 22 is a cross-sectional view showing a second example of a magnetic recording disk according to a second example of a third preferred embodiment taken along a plane parallel to a radial direction of the magnetic recording disk.

As shown in FIGS. 21 and 22, the magnetic layer 16 takes on the shape of the substrate 12. The upper flat surface US of the track 33 or the raised zone 19 is smooth compared to the surface formed by the polishing processes in the texture process. Therefore, the distance d at which the magnetic head 20 travels over the magnetic recording disk 10 can be reduced, so that the recording density can be increased.

The tracks 33 and the raised zones 19 formed from the substrate 12 are formed into a coaxially circular or spiral pattern. Therefore, magnetic anisotropy is obtained in the circumferential direction, so that the magnetic hysterisis of the magnetic layer 16 has a sharp angular form in the circumferential direction.

As described in the first and second examples of the third preferred embodiment, there will be no increase in cross talk as long as the magnetic core 21 is disposed over only the track to be recorded or reproduced, as shown in FIGS. 21 and 22. Consequently, as long as the sum of one width $W_1$ distance and two gap $G_1$ distances is longer than the width W (i.e., $W<W_1+2G_1$), the density of tracks can be increased by reducing the width $W_1$ narrower than width W.

Various modifications can be made to the magnetic recording disk 10 according to the third preferred embodiment while still obtaining the same beneficial effects of the present invention. For example, as described in the first and second preferred embodiments, there are no particular limitations for the width $W_1$ of tracks 33 or for the inter-track distance provided by the gap $G_1$ of the inter-track portions 35. There are also no particular limitations to the width $W_2$ of the raised zones 19 or the inter-zone distance formed by the gap $G_2$ as long as the provided dimensions sufficiently prevent the head from adhering to the surface of the magnetic recording disk 10. Although there are no particular limitations to the height t of the tracks 33, as described in the first preferred embodiment it is preferable for the height t to be greater than the distance d separating the magnetic head 20 from the magnetic recording disk 10.

Figure 24:
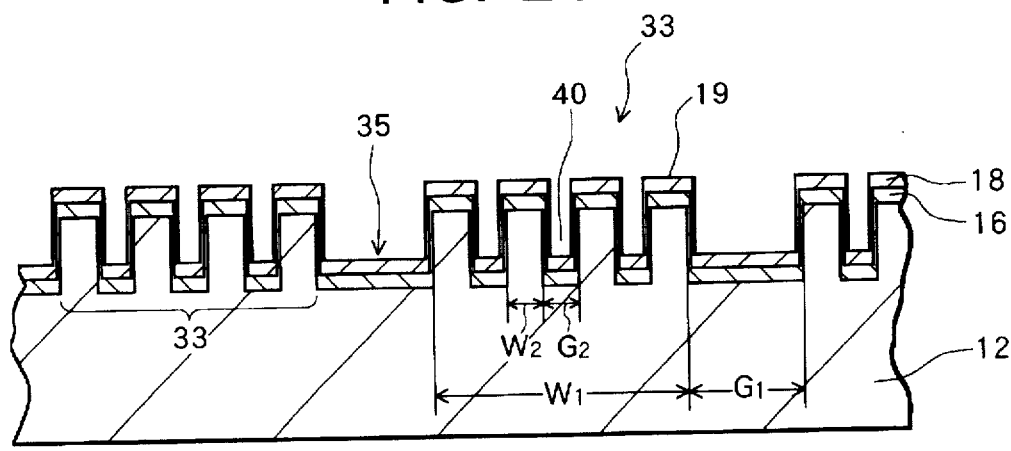
FIG. 24 is a cross-sectional view showing a magnetic recording disk according to a modification of the third preferred embodiment.

Although FIG. 22 shows the substrate 12 of the second example etched deeper in the thickness direction at the inter-track portions 35 than at the portions between the raised portions 19, the substrate 12 can be equally etched at these portions as shown in FIG. 24. This reduces production costs.

Figure 25:
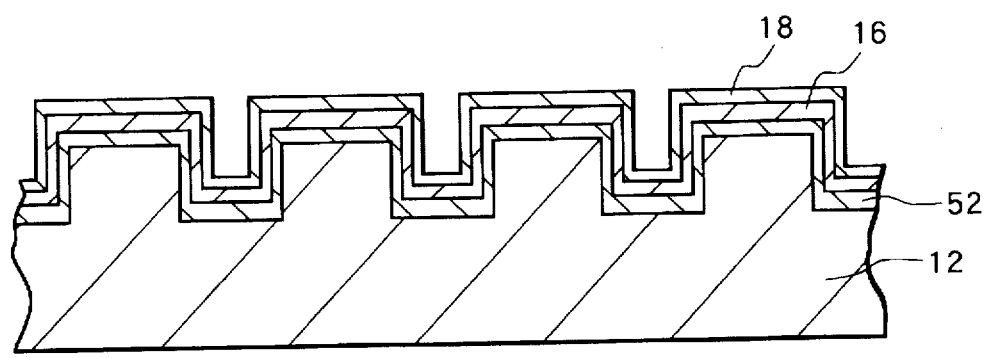
FIGS. 25 (a) and 25 (b) are cross-sectional views showing the magnetic recording disks shown in FIGS. 21 and 22 respectively as modified by another modification of the third preferred embodiment.
Figure 25:
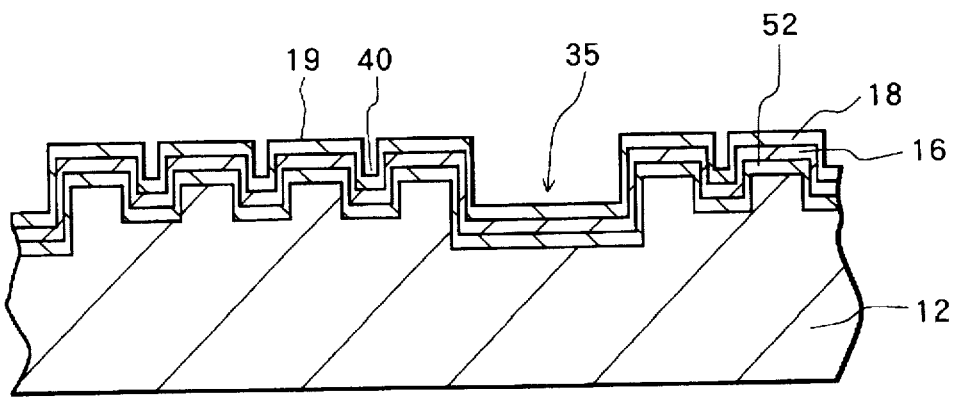

Also, the first and second examples describe the magnetic layer 16 as being formed directly on the substrate 12. However, the magnetic layer 16 can instead be formed on an interposed layer 52. FIGS. 25 (a) and 25 (b) show this interposed layer 52 provided for the first and second examples respectively. The interposed layer 52 provides a smoother more uniform surface on which to form the magnetic layer 16, thereby preventing fluctuations in the magnetic characteristic of the magnetic layer 16 and also improving intimate contact of the magnetic layer 16.

Figure 26:
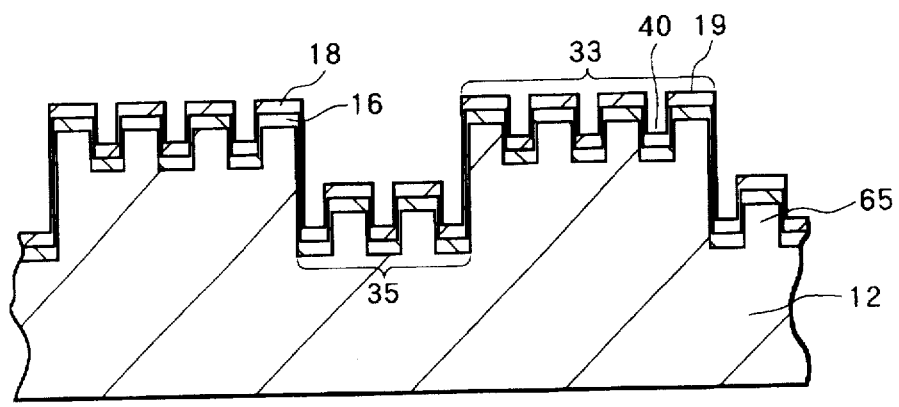
FIG. 26 is a cross-sectional view showing a magnetic recording disk according to a further modification of the third preferred embodiment.

Other methods can be used to produce the magnetic recording disk than the method described while referring to FIGS. 23 (a) through (g). For example, as shown in FIGS. 23 (a) through (g) first the raised zones 19 with width $W_2$ and inter-zone gap $G_2$ are formed and then the tracks 33 with width $W_1$ and inter-zone gap $G_1$ are formed. However, first the substrate can be processed with width $W_1$ and gap $G_1$ and raised zones with width $W_2$ and inter-track gap $G_2$ can be formed afterwards. This would produce the magnetic recording disk 10 shown in FIG. 26 with raised zones 65 formed in the inter-track portions 35. As long as the magnetic layer 16 formed on the raised zones 19 is sufficiently separated from the magnetic layer 16 formed on the raised zones 35, the signal reproduced from the inter-track portions 35 will be sufficiently weaker than the signal reproduced from the tracks 35 so that cross talk can be avoided.

Figure 27:
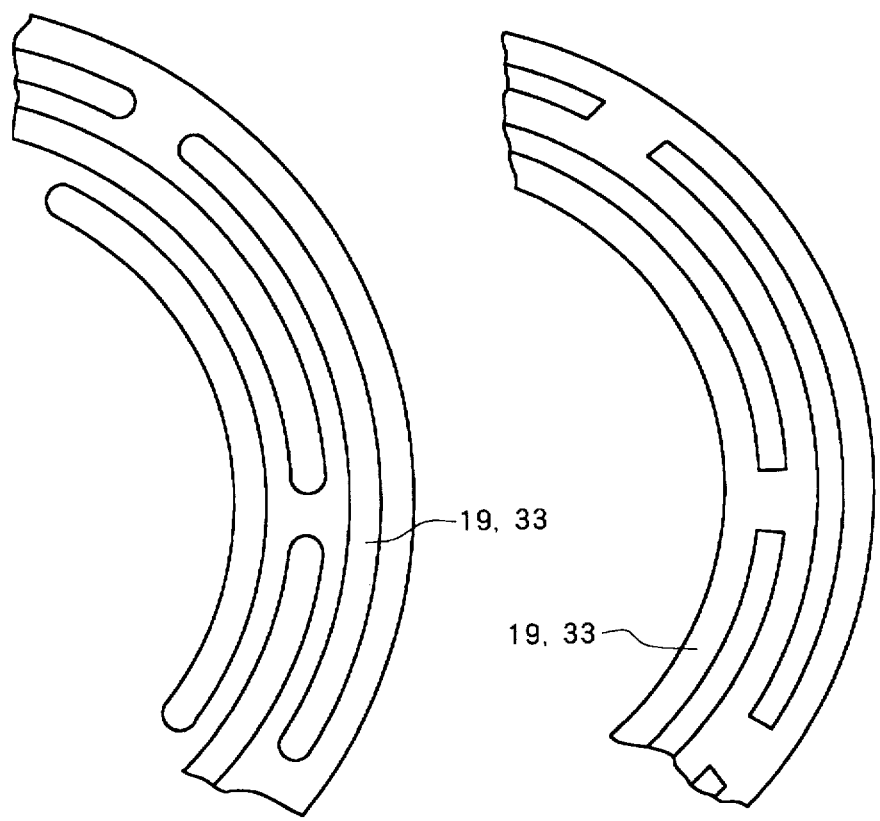
FIG. 27 (a) is a top view showing a possible pattern for tracks of the magnetic recording disk according to the third preferred embodiment.

Although the tracks 33 and the raised zones 19 are described in this embodiment as being formed in a concentric circular or spiral shapes, the benefits described in the preferred embodiment can also be obtained by forming the tracks 33 and the raised zones 19 in arc shapes as shown in FIGS. 27 (a) and 27 (b).

The following text will explain a magnetic disk according to a fourth preferred embodiment of the present invention. The magnetic disc of the fourth embodiment is similar to that of the first through third embodiments, except that the raised zones, tracks, or both are formed into substantially trapezoidal shapes at a cross section cut through the band of the raised zones 19 or tracks 33. Examples of possible substantially trapezoidal shapes are shown in FIGS. 28(a) through 29(b). Stated differently, the cross-sectional area of the raised zones, the tracks, or both taken at a first plane parallel to the radial direction of the magnetic recording disk and perpendicular to the thickness direction is greater than another cross-sectional area of the raised zones taken at any other plane that is parallel to the first plane but closer to the magnetic head 20. This shape prevents the magnetic head 20 from adhering to the magnetic disk and also prevents head crashes. This allows speed of operation and recording density to be increased.

A first example of a magnetic recording disk according the fourth preferred embodiment, as shown in FIG. 28(a), is similar to the magnetic recording disk shown in FIG. 6 of the first embodiment, except that the tracks 33 are substantially trapezoidal in shape when viewed in cross section as in FIG. 28(a).

A second example of a magnetic recording disk according the fourth preferred embodiment, as shown in FIG. 28(b), is similar to the magnetic recording disk shown in FIG. 12 of the second embodiment, except that the tracks 33 and the raised portions 19 formed thereon are substantially trapezoidal in shape when viewed in cross section as in FIG. 28(b).

A third example of a magnetic recording disk according the fourth preferred embodiment, as shown in FIG. 29(a), is similar to the magnetic recording disk shown in FIG. 21 of the first example of the third embodiment, except that the tracks 33 formed thereon are substantially trapezoidal in shape when viewed in cross section as in FIG. 29(a).

A fourth example of a magnetic recording disk according the fourth preferred embodiment, as shown in FIG. 29(b), is similar to the magnetic recording disk shown in FIG. 22 of the second example of the third embodiment, except that the tracks 33 and the raised portions 19 formed thereon are substantially trapezoidal in shape when viewed in cross section as in FIG. 29(b).

Figure 30:
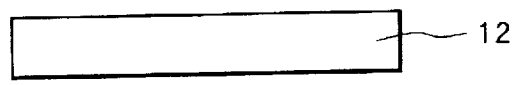
FIGS. 30 (a) through 30 (h) are cross-sectional views showing progressive steps in a production method for forming tracks, raised zones, or both of a magnetic recording disk according to the fourth preferred embodiment of the present invention into substantially trapezoidal shapes.
Figure 30:
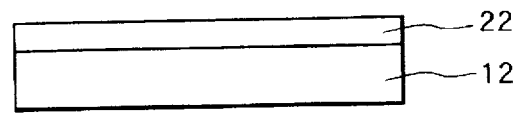
Figure 30:
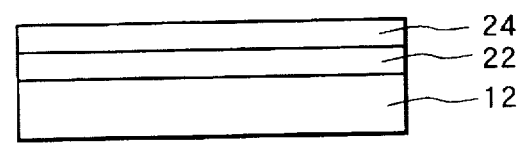
Figure 30:
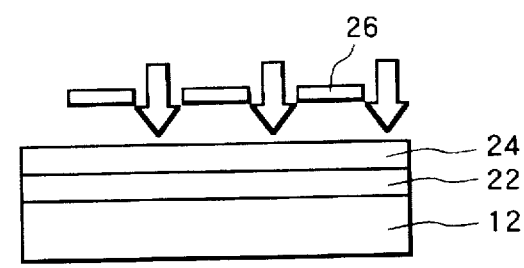
Figure 30:
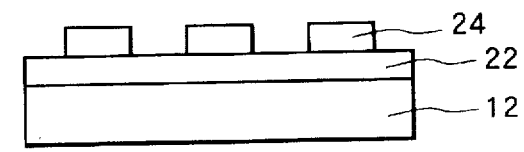
Figure 30:
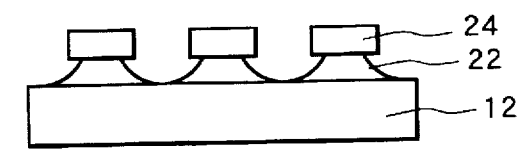
Figure 30:
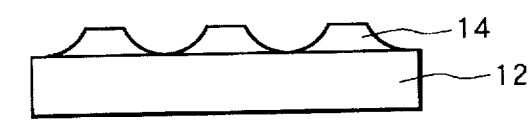
Figure 30:
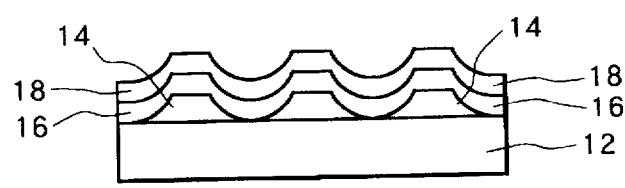

An example of how to form the raised zones, tracks, or both into substantially trapezoidal shapes will be described below while referring to FIGS. 30 (a) through 30 (h). First, the substrate 12 of a disk shape is formed from a flat slab of glass as shown in FIG. 30 (a). Of course, materials other than glass, such as an aluminum alloy or silicon, can be used for the substrate 12. The substrate 12 is polished into a mirror-like surface.

The non-magnetic thin film 22 is sputtered, deposited or otherwise formed to a suitable thickness on the substrate 12 as shown in FIG. 30 (b). Of course, the material of the non-magnetic thin film is a non-magnetic metal, a non-magnetic metal oxide, a non-magnetic nitride or other suitable non-magnetic material.

The high melting point of tantalum, and its oxides and nitrides makes it particularly suitable for the material of the non-magnetic thin film 22. Tantalum and its oxides and nitrides is highly suitable to etching processes, has high resistant to corrosion, and has high selectivity. Also, the non-magnetic thin film 22 can be made from tantalum to a thickness of 5 nm.

As shown in FIG. 30 (c), a resist 24 is next spin coated onto the non-magnetic film 22. Next, as shown in FIG. 30 (d), the resist 24 is exposed with ultraviolet light through a mask 26 with a spiral or concentric circular pattern. Developing forms the pattern of the mask 26 into the resist 24, as shown in FIG. 30 (e). The pattern formed into the resist 24 has a pitch of between about 0.4 µm to several µms. If a positive resist is used for the resist 24, the portion of the resist illuminated by the ultraviolet light is dissolved by a developing solvent during developing. Contrarily, if a negative resist is used for the resist 24, the portion of the resist not illuminated by ultraviolet light is dissolved by the developing solvent during developing.

Figure 31:
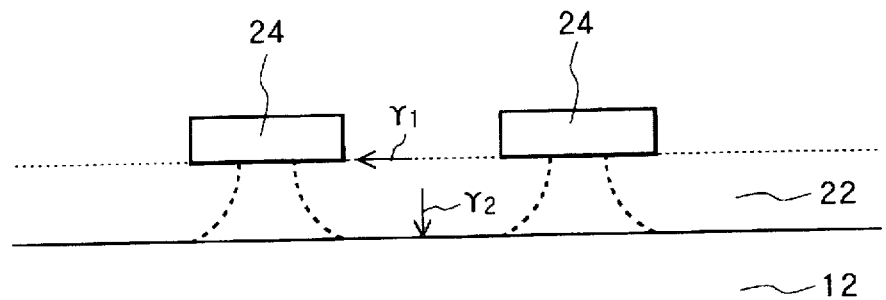
FIG. 31 is a cross-sectional view showing details of requirements of the production step shown in FIG. 30 (f)

After developing, the disk appears as shown in FIG. 30 (e) with a resist pattern formed thereto. The non-magnetic thin film 22 can then be etched using wet or dry etching, or some other suitable etching method. The material of the layer to be etched can be any suitable material. Also, the layer to be etched can be etched to various thicknesses, shapes, and sizes. More specifically, the exposed portions of the non-magnetic thin film 22 are completely etched until the top surface of the substrate 12 appears as shown in FIG. 30 (f). Isotropic etching or incomplete anisotropic etching methods can be used for this process, but a completely anisotropic etching method cannot. As shown in FIG. 31, in an isotropic etching method the speed at which the etching process eats into the material under the resist $r_1$ equals the speed at which the etching process proceeds in the downward direction $r_2$ (i.e., $r_1=r_2$). The downward direction in this embodiment is towards the substrate 12. In an incomplete anisotropic etching method, $r_1$ does not equal $r_2$ (i.e. $r_1 \neq r_2$) or $r_1$ is not much less than $r_2$ (i.e., not $r_1<<r_2$). In a complete anisotropic etching method, $r_1$ is much less than $r_2$ (i.e., $r_1<<r_2$).

Figure 32:
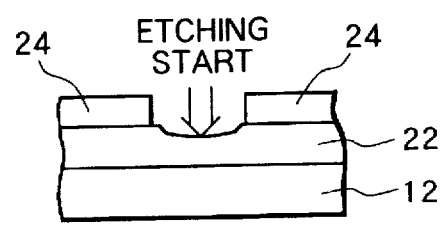
FIGS. 32 (a) through (c) are cross-sectional views showing temporal changes during the production step shown in FIG. 30 (f)
Figure 32:
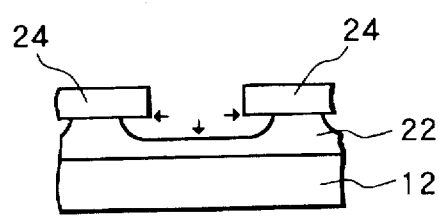
Figure 32:
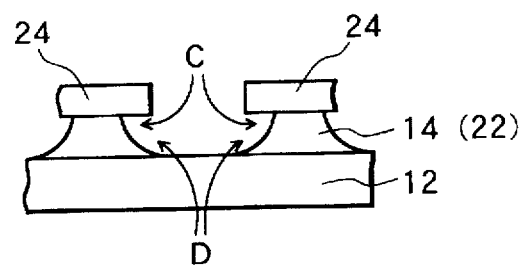

In an isotropic etching method or an incomplete anisotropic etching method where $r_1$ and $r_2$ do not satisfy $r_1<<r_2$, the combination of the etching gas and the etching liquid are selected so that etching starts at portions of the non-magnetic thin film 22 where no resist 24 is positioned. The progress of the isotropic etching method or the incomplete anisotropic etching method is shown in FIGS. 32(a) through 32(c). Etching first begins in the downward direction only as shown in FIG. 32(a). Then, etching also begins in the non-magnetic film 22 in the lateral direction at a position immediately under the resist 24 as shown in FIG. 32(b). After the non-magnetic thin film 22 has been completely etched to the substrate 12, the portion of the non-magnetic thin film 22 near to the substrate 12 is also etched in the lateral direction, as shown in FIG. 32(c). Because the non-magnetic thin film 22 has been etched for durations of time in the vertical and lateral directions corresponding to the speeds $r_1$ and $r_2$ and because those speeds do not satisfy $r_1<<r_2$, in the resulting track 33 or raised zone 19 shown in FIG. 32(c), the portion C near the resist 24 is etched for a longer duration of time than the portion D near the substrate 12. Therefore, more material is removed at portion C than at portion D. As a result, the substantially trapezoidal shape shown in FIG. 30(g) is formed.

On the other hand, a completely anisotropic etching method etches the non-magnetic thin film 22 in a very short period of time downward toward the substrate 12 (i.e., $r_1<<r_2$). Accordingly, the portion of the non-magnetic thin film near the resist 24 is etched for the same duration of time as the portion near the substrate 12. Therefore, a complete anisotropic etching method can not produce the non-magnetic thin film to a substantially trapezoidal shape.

The following are two concrete examples of the etching process that can be used to form the non-magnetic thin film 22 to the shape shown in FIG. 30 (g).

In the first example, tantalum is used for the material of the non-magnetic thin film 22. Wet etching tantalum with good control is extremely difficult because tantalum is easily corroded by acid and other etching liquids. Normally tantalum is dry etched using a plasma. Accordingly, in this case, the substrate shown in FIG. 30 (e) is first set in the etching chamber of a parallel-flat-board type high-frequency etching device. The etching chamber is evacuated to $1 \times 10^{-3}$ Pa or less. Then Flon 14 ($CF_4$) and oxygen are introduced into the etching chamber at rates of 100 cc/min and 20 cc/min respectively. After the gas mixture is introduced, pressure in the etching chamber is adjusted to 30 Pa. A high frequency of 13.56 MHz is applied while maintaining the 30 Pa pressure. Isotropic or incomplete anisotropic etching can be performed by using such a high pressure in combination with Flon 14 gas.

In the second example, chromium is used for the material of the non-magnetic thin film 22. In this case, both wet and dry etching can be performed. Wet etching is performed with an aqueous solution of Cerium Diammonium Nitrate. Wet etching performed using a normal etching liquid will provide a value of $r_1$ that is not much less than the value of $r_2$ as long as the material to be etched, that is, the material of the non-magnetic thin film, is not a single crystal. Dry etching is performed in a cylindrical etching device with an electrode provided to the outer surface of the cylinder or a parallel-flat-board type etching device. The non-magnetic thin film can be formed so that the value of $r_1$ is not much less than the value of $r_2$ by etching at the relatively high pressure of 20 Pa or higher.

In the above-described examples, the listed concrete values of pressures are merely standard examples. The actual pressure used will vary with the shape of the etching device, the gas, and the amount of gas used.

When the etching operation is completed, the remaining resist portion is removed to produce the shape shown in FIG. 30 (g).

Then, the magnetic layer 16 and the protective layer 18 are sputtered on the non-magnetic layer 16.

The above-described manner of producing the trapezoidal shapes is directed to the examples of FIGS. 28(a) and 28(b)

where the non-magnetic film 14 is formed with the tracks and/or raised zones. However, the above-described manner can be applied to the examples of FIGS. 29(a) and 29(b) where the non-magnetic substrate 12 is formed with the tracks and/or raised zones.

Providing a substantially trapezoidal shape to the raised zones, the tracks, or both reduces turbulence in air currents generated with the magnetic disk 10 rotates, and also, reduces wandering of the head caused by these air current turbulences. As a result, head crashes can be prevented even when the distance d between the head and the magnetic disk 10 is reduced.

Figure 33:
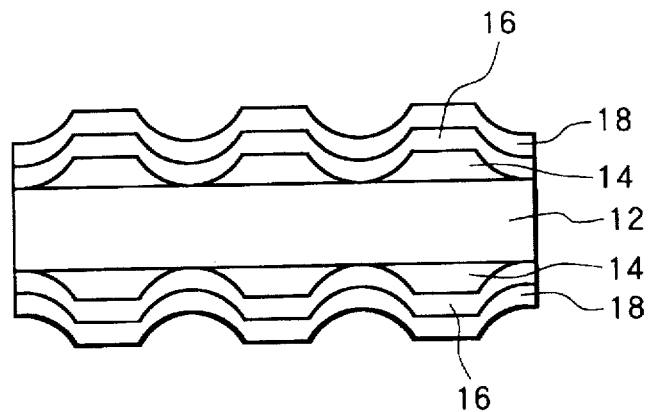
FIG. 33 is a cross-sectional view showing still a magnetic recording disk according to a further modification of the fourth preferred embodiment.

In the present embodiment, if the above processes are performed to both sides of the substrate, a magnetic disk as shown in FIG. 33 can be formed. The process can be performed simultaneously on both sides of the substrate. The exposure light can alternatively be a focused laser beam.

As described above, according to the present invention, at least a single track is formed in the non-magnetic thin film 14 or the non-magnetic substrate 12 to a predetermined width. The magnetic layer takes on the shape of the non-magnetic thin film. Because of this and because the track is flat at its upper surface, the magnetic head can be brought extremely close to the magnetic recording disk. The recording density along the circumferential direction can therefore be greatly increased. Good reproduce output can be obtained by selecting the width of the track 33 greater than the gap formed by the inter-track portion 35. It is possible to prevent the magnetic head from adhering to the surface of the magnetic recording disk by selecting sum of the width of the track 33 and the gap formed by the inter-track portion 35 to be smaller than the width of the magnetic head.

It is also possible to prevent the magnetic head from adhering to the surface of the magnetic recording disk by forming the plural raised zones on the tracks. The recording density along the radial direction can be increased by making the width of the tracks narrower than the width of the core provided to the magnetic head. Because only a small signal is reproduced from inter-track portions, cross talk can be controlled.

While the invention has been described in detail with reference to preferred embodiments thereof, it would be apparent to those skilled in the art that various changes and modifications may be made therein without departing from the spirit of the invention.

Figure 34:
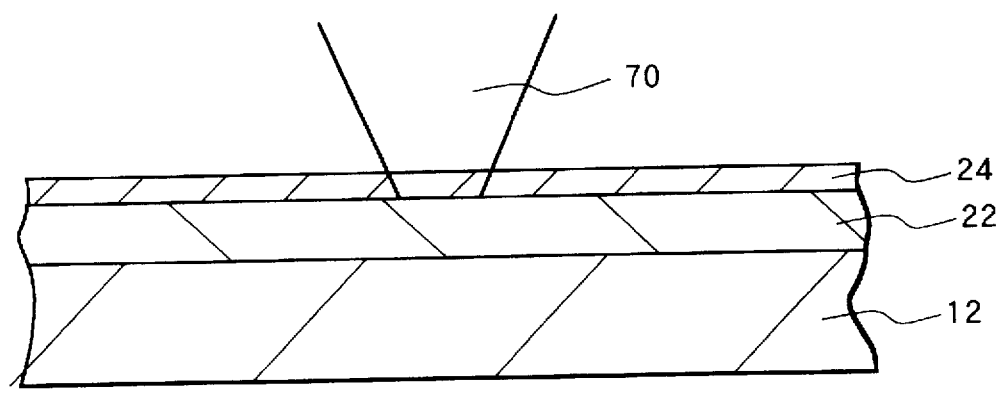
FIG. 34 is a cross-sectional view showing another possible method of forming the magnetic recording disks described in the first through fourth preferred embodiments.

For example, during the production method described in each of the first through fourth preferred embodiments, the concentric circular or spiral pattern of the tracks 33 or of the raised zones 19 is produced using masks 26 and 32. However, as shown in FIG. 34 to form a predetermined pattern by developing, a substrate 12 coated with photoresist can be illuminated with light 70 from, for example, an argon laser while the substrate 12 is rotated.

There is no need to form the tracks 33 or the inter-track portions 35 to a uniform width $W_1$ or inter-track gap $G_1$ across the entire magnetic recording disk. Similarly, there is no need to form the raised zones 19 or the inter-zone portions 40 to a uniform width $W_2$ or inter-zone gap $G_2$ across the entire magnetic recording disk. For example, when the position where the magnetic recording disk 10 halts and comes into contact with the magnetic head 20 is predetermined, providing a narrow width to the track 33 or the raised zone 19 provided thereto only at the contact position can sufficiently prevent the magnetic head 20 from adhering to the magnetic recording disk 10.

There is no need to form the tracks 33 or the raised zones 19 to have a uniform thickness or height across the entire magnetic recording disk. More specifically, in the first and second embodiments, there is no need to form the non-magnetic thin film 14 with a uniform film thickness across the entire magnetic recording disk. In the third embodiment, there is no need to form the tracks 33 or the raised zones 19 with a uniform thickness across the entire magnetic recording disk. Linear speed of the rotating magnetic recording disk 10 increases with increase in radial distance from its center. Because, the velocity of air currents produced at the surface of the rotating magnetic recording disk 10 also increases with radial distance from the center, the distance d at which the magnetic head 20 floats above the magnetic recording disk 10 can also change with radial distance. The height of the tracks 33 and the raised zones 19 can be provided to compensate for any such change in the amount the head 20 floats above the surface of the magnetic recording disc 10. The height of the tracks 33 and the raised zones 19 can be regulated corresponding to the change in the distance the magnetic head 20 is separated from the magnetic recording disk 10.

In the first embodiment and the first example of the third embodiment, the width $W_1$ of the track 33 may be selected to be less than the width W of the core 21, as in the second embodiment. In this case, the sum of one width $W_1$ distance and two gap $G_1$ distances should still be longer than the width W of the core 21 (i.e., $W<W_1+2G_1$).

In the second embodiment and the second example of the third embodiment, the width $W_1$ of the track 33 should be selected to be longer than the gap $G_1$ formed by the inter-track portion 35, as in the first embodiment. In this case, the sum of the width $W_1$ and the gap $G_1$ should be lower than the width $W_c$ of the magnetic head 20.

Figure 28:
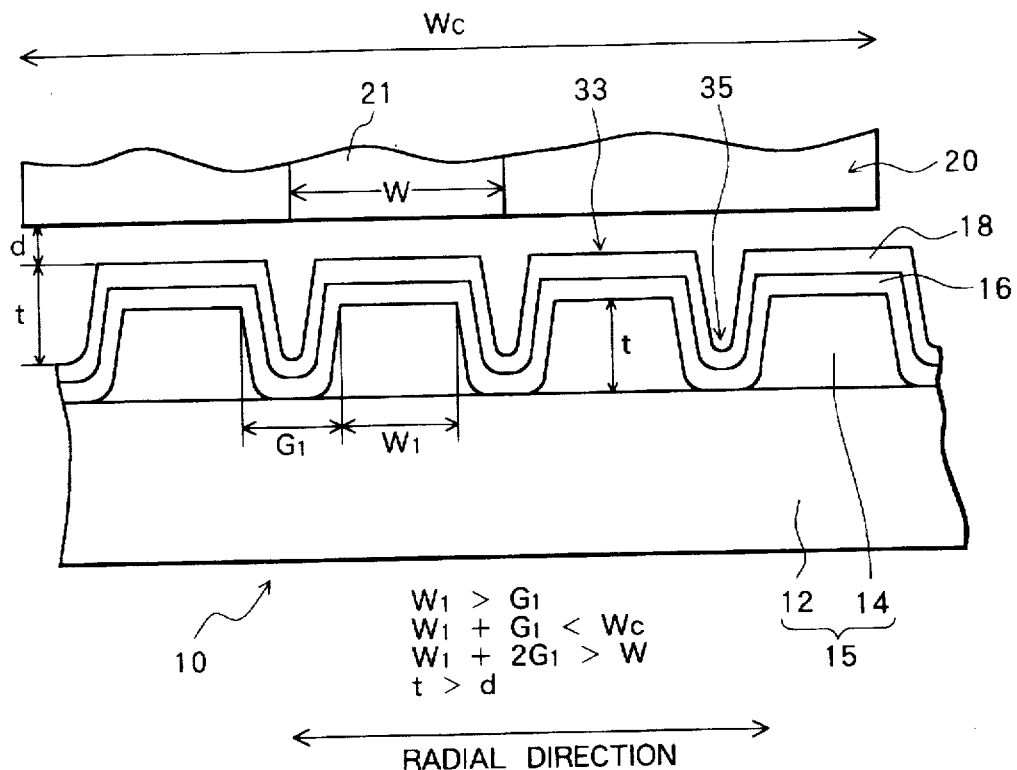
FIG. 28 (a) is a cross-sectional view showing a magnetic recording disk according to first example of a fourth preferred embodiment of the present invention taken along a plane parallel to a radial direction of the magnetic recording disk.
Figure 28:
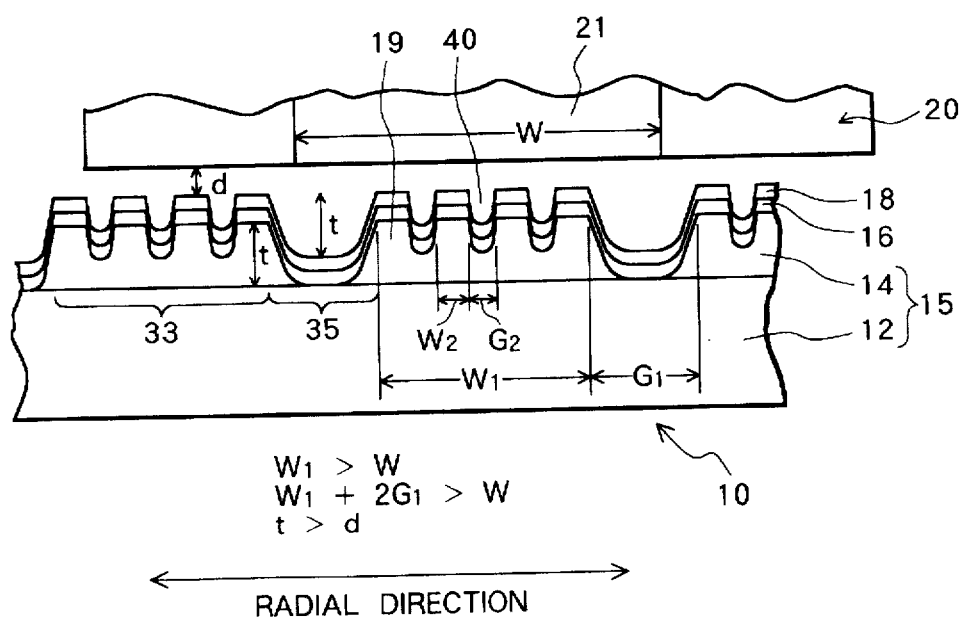
Figure 29:
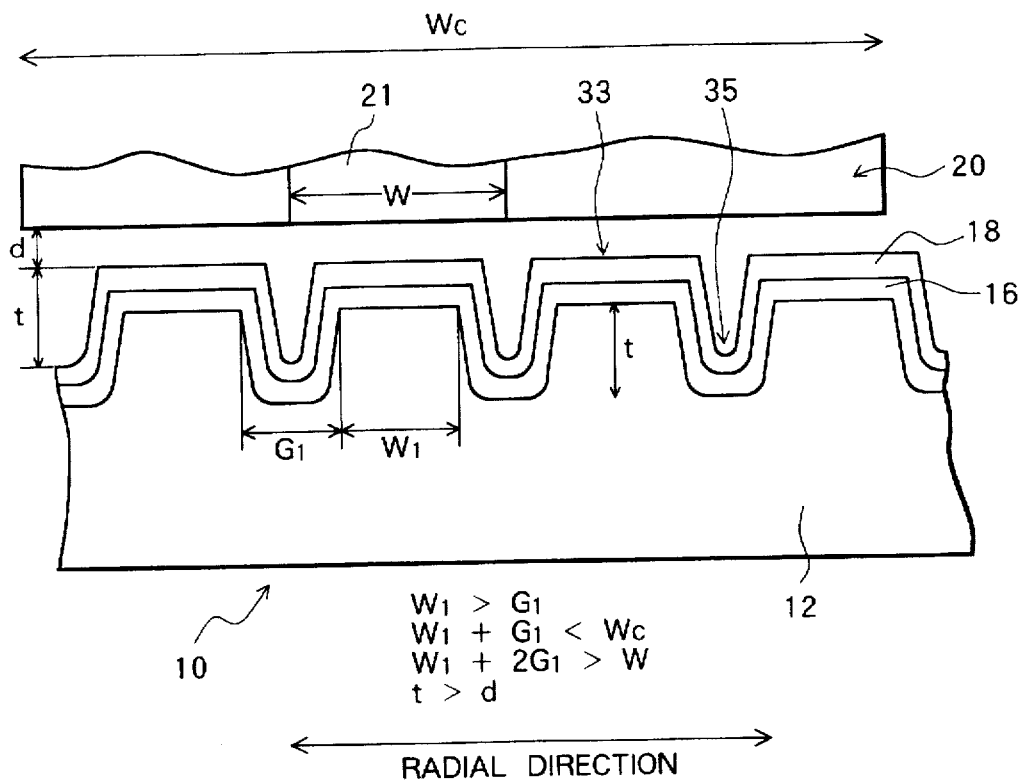
FIG. 29 (a) is a cross-sectional view showing a magnetic recording disk according to a third example of the fourth preferred embodiment taken along a plane parallel to a radial direction of the magnetic recording disk.
Figure 29:
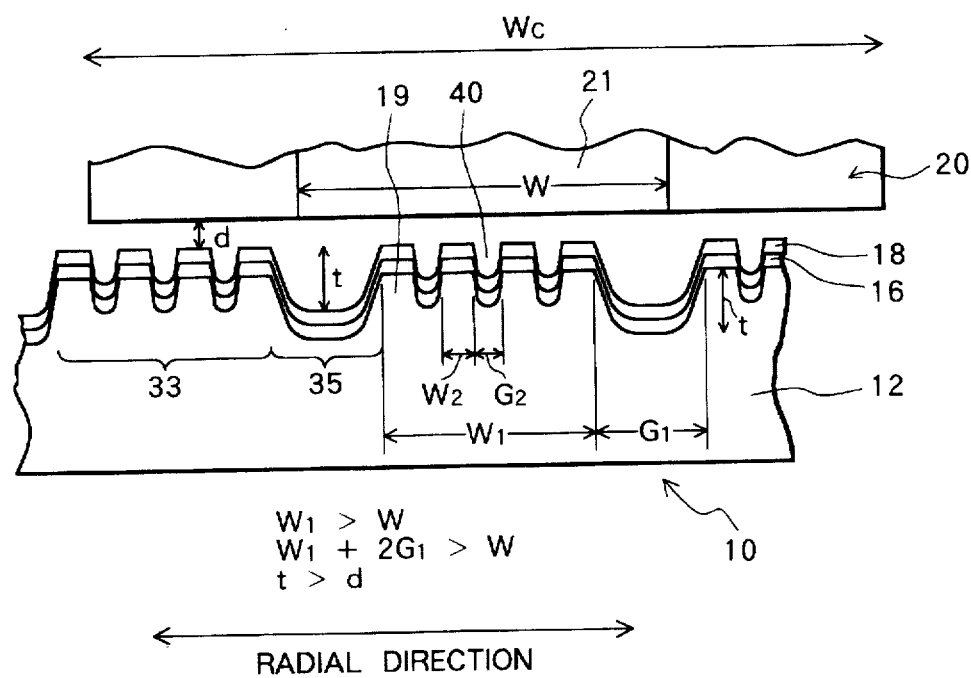
Figure 35:
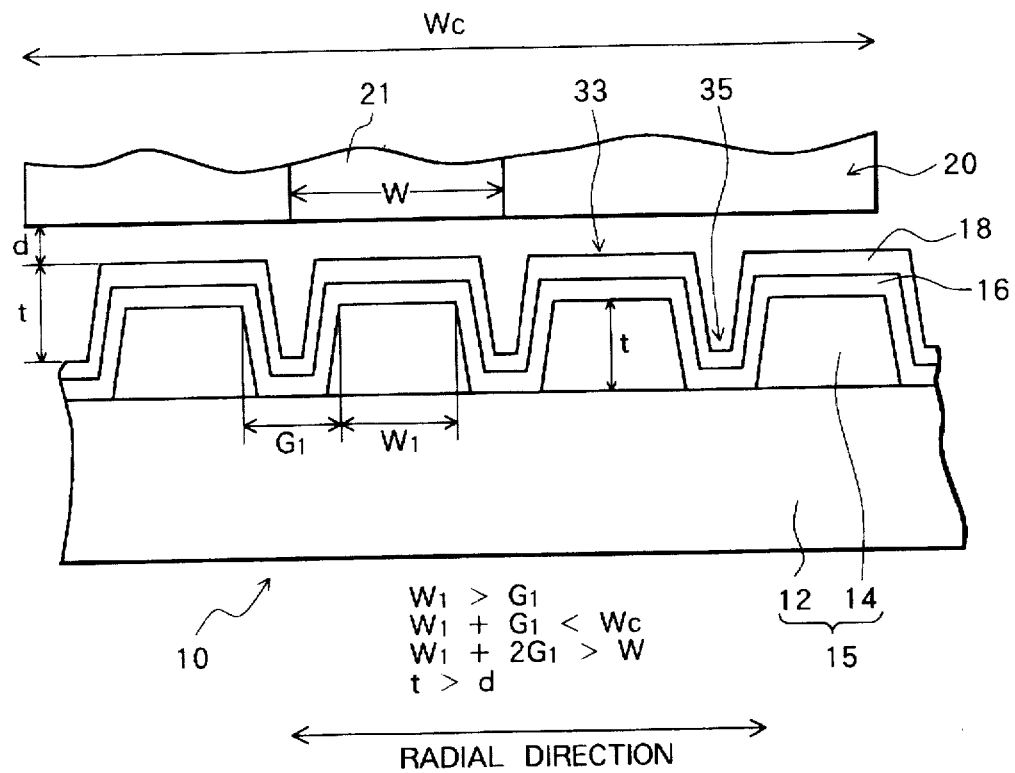
FIGS. 35 (a), 35 (b), 36 (a), and 36 (b) are cross-sectional views showing modifications of the magnetic recording disks shown in FIGS. 28 (a), 28 (b), 29 (a), and 29 (b), respectively, taken along planes parallel to radial directions of the magnetic recording disks.
Figure 35:
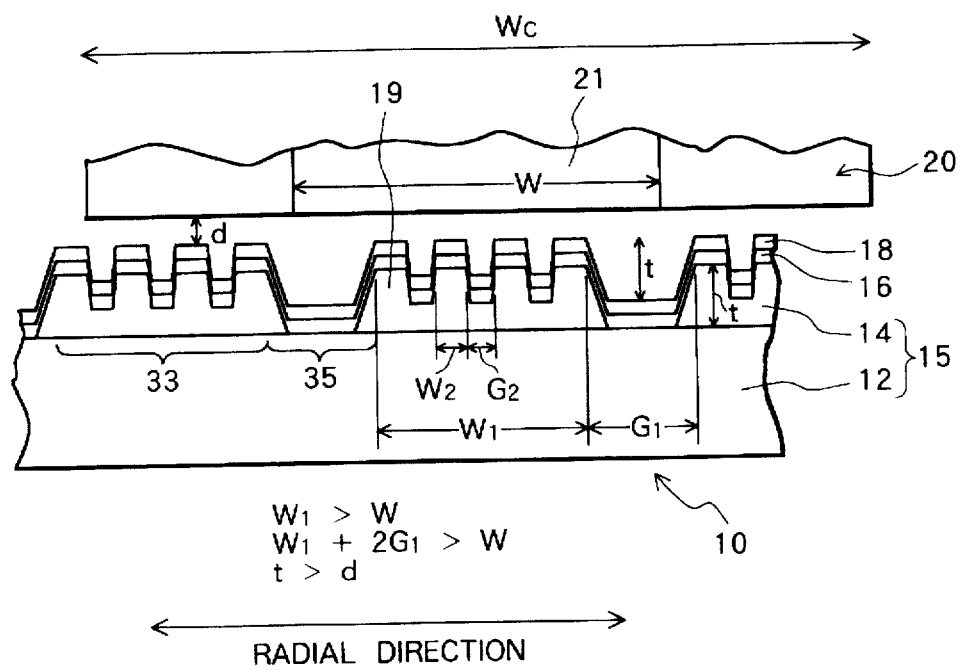
Figure 36:
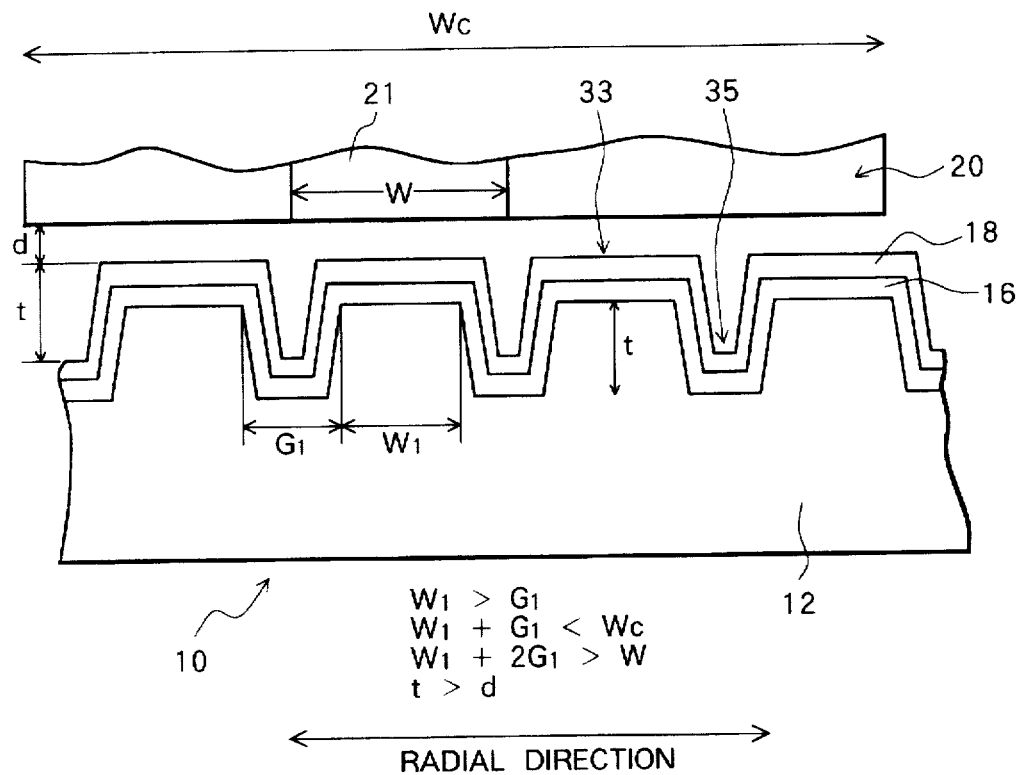
Figure 36:
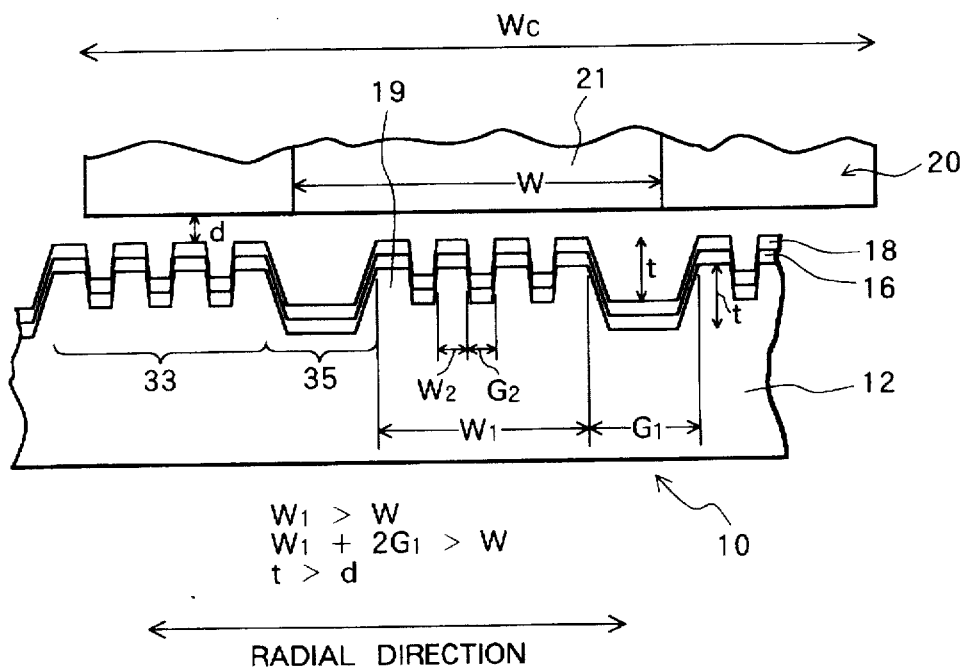

In the fourth preferred embodiment, the tracks 33 and any raised zones 19 formed thereon, and inter-track portions 35, are shown in FIGS. 28 (a) through 29 (b) as having rounded edges. However, the tracks 33 and any raised zones 19 thereon, and inter-track portions 35, could be formed with angular edges as shown in FIGS. 35 (a), 35 (b), 36 (a), and 36 (b). In other words, the substantially trapezoidal shape of the tracks, raised zones, or both can be formed by straight edges or curved edges.

What is claimed is:

1. A magnetic recording disk, for recording information, said disk having an upper disk surface to confront a magnetic head and comprising:

a circular-shaped non-magnetic glass substrate having a smooth upper substrate surface and a non-magnetic thin film provided on top of said smooth upper substrate surface, said non-magnetic glass substrate being provided with a plurality of tracks on said top of said smooth upper substrate surface, said plurality of tracks extending upwardly and in a circumferential direction, each track of the plurality of tracks having a band-shaped contour having an upper flat track surface and having a width in a radial direction perpendicular to the circumferential direction, the plurality of tracks being formed from the non-magnetic thin film and being juxtaposed in the radial direction so that each pair of adjacent tracks is separated by an inter-track gap in the radial direction wherein said inter-track gap is formed by removal of the non-magnetic thin film so that the smooth upper substrate surface of the non-magnetic glass substrate is exposed at said inter-track gap, the width of each track, measured in the radial direction, being greater than the width of the associated inter-track gap;

a magnetic layer coating exposed surfaces of said tracks formed of said non-magnetic thin film and also coating exposed surfaces of said non-magnetic glass substrate; and a protective layer coating said magnetic layer.

2. A magnetic disk as claimed in claim 1 wherein the inter-track gap has a surface extending between said pair of tracks, said magnetic layer being provided on both of the upper flat surface of each track and the surface of the inter-track gap extending between tracks, said protective layer being provided over said magnetic layer on both of the upper flat surface of each track and the surface of the inter-track gap extending between tracks, the protective layer defining an uppermost flat surface positioned on the upper surface of each track.

3. A magnetic disk as claimed in claim 2, wherein a magnetic head is disposed confronting the uppermost flat surface of the magnetic recording disc for recording information on or reproducing information from the magnetic recording disk, the magnetic head and the uppermost surface of the magnetic recording disc being separated by a distance smaller than a distance defined between the upper flat surface of each track of the plurality of tracks and the lower surface of the inter-track gap in a direction normal to the upper flat surface.

4. A magnetic recording disk as claimed in claim 1, wherein the plurality of tracks are juxtaposed in a concentric circular pattern.

5. A magnetic recording disk as claimed in claim 1, wherein the plurality of tracks are juxtaposed in a spiral pattern.

6. A magnetic recording disk for being recorded on or reproduced by a core of a magnetic head disposed so that during recording on or reproducing from the magnetic recording disk the core confronts a surface of the magnetic recording disk, the core having a width, the width being in a direction parallel to a radial direction of the magnetic recording disk when the magnetic head is disposed for recording on or reproducing from the magnetic recording disk, the core and a magnetic head confronting surface of the magnetic recording disk being separated by a distance when the magnetic head is disposed for recording on or reproducing from the magnetic recording disk, the magnetic recording disk comprising:

a non-magnetic glass substrate having a smooth surface directed toward said magnetic head confronting surface;

a non-magnetic thin film supported on the smooth surface of said non-magnetic glass substrate, said non-magnetic thin film being formed in a plurality of tracks extending toward said magnetic head confronting surface, each track of the plurality of tracks having a band-shaped curved contour, the contour of each track of the plurality of tracks having a width in the radial direction of the magnetic recording disk, the plurality of tracks being juxtaposed in the radial direction so that adjacent tracks are separated by an inter-track gap wherein said inter-track gap is formed by removal of the non-magnetic thin film so that the smooth surface of the non-magnetic glass substrate is exposed at said inter-track gap, the width of each track of the plurality of tracks being greater than the inter-track gap;

a magnetic layer coating exposed surfaces of said tracks formed of said non-magnetic thin film and also coating exposed surfaces of said non-magnetic glass substrate; and a protective layer coating said magnetic layer.

7. A magnetic disk as claimed in claim 6, wherein each track of the plurality of tracks has a thickness in a thickness direction extending away from said non-magnetic substrate, the thickness of each track of the plurality of tracks being greater than the distance separating the magnetic recording disk from the magnetic head during reproducing and recording of the magnetic recording disk.

8. A magnetic recording disk as claimed in claim 6, wherein the width of the contour of each track of the plurality of tracks is narrower than the width of the core.

* * * * *